United States Patent [19]
Zobel, Jr. et al.

[11] Patent Number: 5,724,775
[45] Date of Patent: Mar. 10, 1998

[54] MULTI-PIECED, PORTABLE PROJECTION DOME AND METHOD OF ASSEMBLING THE SAME

[75] Inventors: Richard W. Zobel, Jr., Raleigh; David T. Bennett, Chapel Hill; Raymond L. Idaszak, Apex; Dennis Kovach, Cary, all of N.C.

[73] Assignee: Alternate Realities Corporation, Research Triangle Park, N.C.

[21] Appl. No.: 593,041

[22] Filed: Jan. 29, 1996

[51] Int. Cl.$^6$ .............................. E04H 3/22; G03B 21/56
[52] U.S. Cl. ................... 52/82; 52/6; 52/80.1; 52/81.5; 52/581; 52/582.1; 359/443; 359/451
[58] Field of Search ..................... 52/6, 80.1, 80.2, 52/81.1, 81.5, 820, 581, 582.1; 472/58, 61, 136; 359/443, 451, 452, 453, 459, 449

[56] References Cited

U.S. PATENT DOCUMENTS

| | | |
|---|---|---|
| 2,280,206 | 4/1942 | Waller et al. . |
| 2,753,818 | 7/1956 | Green . |
| 3,348,897 | 10/1967 | Diaux ........................ 359/451 |
| 3,924,367 | 12/1975 | Stewart ..................... 52/82 X |
| 3,992,841 | 11/1976 | Ward, Jr. . |
| 4,227,047 | 10/1980 | Horne ........................ 52/6 X |
| 4,352,664 | 10/1982 | Morrison et al. . |
| 4,473,355 | 9/1984 | Pongratz . |
| 4,483,033 | 11/1984 | Gebert . |
| 4,514,347 | 4/1985 | Reed . |
| 4,573,924 | 3/1986 | Nordberg . |
| 4,599,645 | 7/1986 | Brown et al. . |
| 4,631,867 | 12/1986 | Reed . |
| 4,642,945 | 2/1987 | Browning et al. . |
| 4,750,807 | 6/1988 | Chamayou dit Felix . |
| 4,784,172 | 11/1988 | Yacoboni ..................... 52/81.1 X |
| 4,964,718 | 10/1990 | Van Hoogstrate . |
| 5,004,331 | 4/1991 | Haseltine . |
| 5,011,263 | 4/1991 | Hopper ........................ 359/451 |
| 5,023,725 | 6/1991 | McCutchen . |
| 5,071,209 | 12/1991 | Chang . |
| 5,137,450 | 8/1992 | Thomas . |
| 5,140,790 | 8/1992 | Modglin et al. . |
| 5,151,802 | 9/1992 | Couturier . |
| 5,179,440 | 1/1993 | Loban et al. . |
| 5,182,150 | 1/1993 | Carlos et al. . |
| 5,272,652 | 12/1993 | Rosenshein et al. . |
| 5,305,564 | 4/1994 | Fahey ........................ 52/81.5 |
| 5,313,763 | 5/1994 | Oram ........................ 52/80.2 |
| 5,316,480 | 5/1994 | Ellsworth . |
| 5,433,608 | 7/1995 | Murray . |
| 5,437,756 | 8/1995 | Carlos et al. . |
| 5,541,769 | 7/1996 | Ansley et al. ............... 359/451 |

FOREIGN PATENT DOCUMENTS

WO 91/07696   5/1991   WIPO .

*Primary Examiner*—Carl D. Friedman
*Assistant Examiner*—Yvonne Horton-Richardson
*Attorney, Agent, or Firm*—Myers Bigel Sibley & Sajovec, LLP

[57] ABSTRACT

A multi-piece dome is constructed from a plurality of rigid panels and configured to receive a hemispherical optical projection on a truncated spherical inner surface. The inner view surface has a predetermined retroreflectivity. The multi-piece dome is lightweight, portable, self-supporting, and easily assembled, disassembled and transported from one location to another.

81 Claims, 8 Drawing Sheets

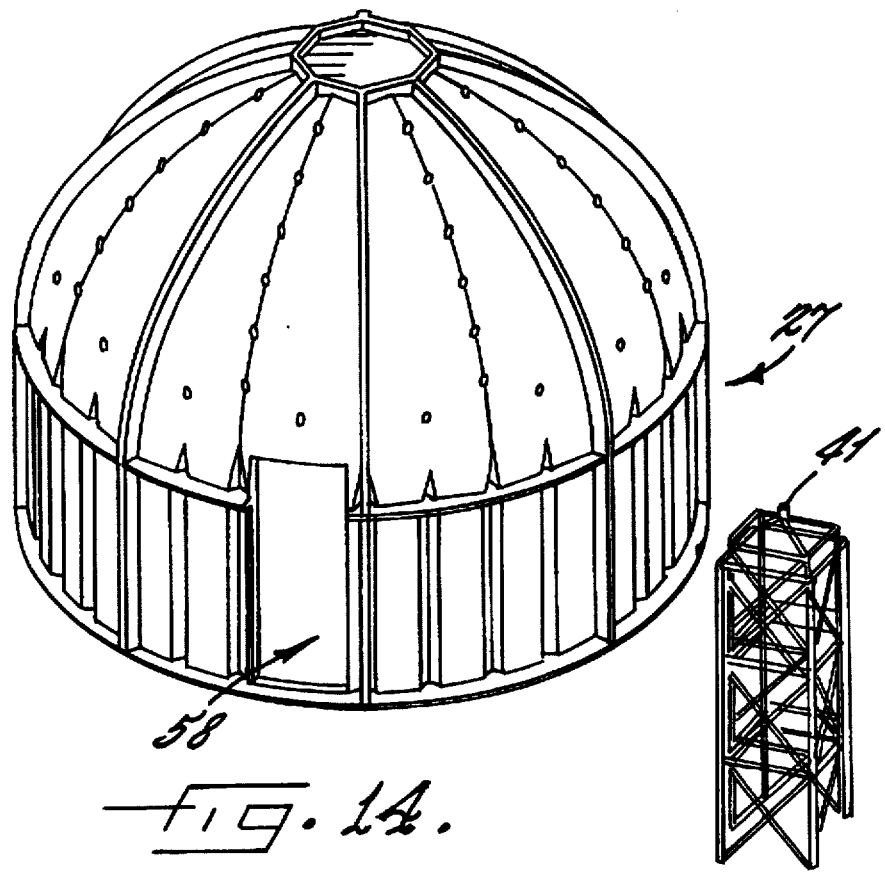

MULTI-PIECED, PORTABLE PROJECTION DOME AND METHOD OF ASSEMBLING THE SAME

FIELD OF THE INVENTION

This invention relates to domes for optical projection systems and more particularly to projection domes and to methods of assembling the same.

BACKGROUND OF THE INVENTION

Buildings and structures of various sizes and shapes have been built for use as planetariums, theaters and flight simulators. Generally, these structures are large, permanent buildings built by conventional construction methods and utilizing building materials such as brick, stone, wood and cinder block. These structures include projection surfaces of various configurations for projecting images thereon. Such permanent structures generally require difficult, time consuming and costly construction. Further, once constructed, these structures are generally not movable to another location.

In some of these structures, images have been projected on curved surfaces either from outside of the structure onto the back of a projection surface or from within the structure on the inner surface of a curved screen or dome. The viewing surfaces of structures designed for inner surface projection are generally applied separately from the supportive structure. These viewing surfaces are typically applied by a coating of reflective paint on an inner surface of the structure or by applying a separate screen layer or skin made from material including metal, aluminum, or fiberglass. Applying a viewing surface to a separate support structure may also be costly, time consuming and generally must be done after construction of the support structure. The surface characteristics of such separately applied viewing surfaces can lack the precision needed for certain projection applications. Additionally, transporting the construction materials and constructing the structure generally requires heavy equipment.

Some of these structures built in combination with curved projection surfaces have been configured as domes or partial domes constructed in connection with a separate support structure, skeleton or building. These various projection structures or domes built with structural platforms and buildings have generally relied on the accompanying structure for support and stabilization. Some structures have used panels constructed of materials such as wood, metal and fiberglass to construct the dome structure.

In these dome structures various projection screens have been employed. Some of these dome structures have utilized a skin or layered projection surface connected to the dome construction panels. Still others of these dome structures have used panels coated or painted with a reflective paint applied to provide a projection surface. Still other projection structures have utilized multiple panel screens of different shapes such as triangles or trapezoidal facets formed on a structural skeleton or structure. Such complex, multi-panel metal screen structures generally require precise machining, and are often difficult, expensive and time consuming to construct. Typically, such systems are also designed to be constructed on a large scale in a permanent location.

Projection structures have also been built incorporating inflatable flexible fabric domes with separate support structures. Typically, these flexible, fabric inflatable domes have been used with projection devices which project images onto the back of the fabric screen. These structures combine an inflatable flexible fabric dome screen secured to a separate dome structure whereby the inflatable fabric screen is suspended in a dome-shaped configuration by vacuum or air pressure. Such inflatable domes typically do not provide a dome with an inner viewing surface for receiving images projected from within the dome. Further, the nature of the screen supported by air pressure or vacuum does not provide a precisely shaped screen or a viewing surface with desired surface characteristics.

Certain domes have been constructed specifically to receive images projected on an inner surface by hemispherical optical projection systems, i.e. systems and methods which project images at an angle of at least about 160 degrees. Generally these structures have been the large, permanently constructed planetariums, commercial and military flight simulators and hemispherical theaters such as OMNIMAX® theaters as those previously described. Heretofore, domes for use with these hemispherical optical projection systems and methods have generally been like the large, permanently constructed domes described above having a predetermined radius for a particular optical projection system and method.

These projection structures have also been configured to receive hemispherical projection from a single, fixed orientation. For example, planetariums typically are built to receive projection in a fixed, vertically upright position, while flight simulators and hemispherical theaters are typically designed to receive projection from an oblique angle from vertical, based upon the audience seating configuration.

With the present interest in virtual reality, hemispherical optical projection systems and methods have been investigated for projecting images which simulate a real environment. Such images are typically computer-generated multimedia images including video, but they may also be generated using film or other media. Home theater has also generated much interest, and hemispherical optical projection systems and methods are also being investigated for home theater applications and other low cost applications, including types of virtual reality. These projection applications make a dome which is portable, easy to assembly and disassemble, and configured to receive a variety of hemispherical optical projection systems desirable.

SUMMARY OF THE INVENTION

It is therefore an object of the present invention to provide an improved projection structure for use with hemispherical optical projection systems.

It is another object of the present invention to provide a dome having a viewing surface with versatility in receiving images from various hemispherical optical projection systems and at various angles of projection.

It is another object of the present invention to provide a self-supporting, portable, rigid, dome structure with an inner projection surface for use with optical projection systems, including hemispherical optical projection systems.

It is another object of the present invention to provide a projection dome structure which can be easily assembled and disassembled in a variety of locations, including indoors and outdoors, and without heavy machinery for use with hemispherical optical projection systems.

It is still another object of the present invention to provide a projection dome structure which can be easily transported from one location to another.

It is another object of the present invention to provide a rigid, lightweight, dome panel for use in constructing a lightweight, portable, rigid, self-supporting dome for use with a hemispherical optical projection system.

It is a still further object of the present invention to provide a method of constructing a lightweight, portable, rigid, self-supporting dome for use with a hemispherical optical projection system.

These and other objects are provided according to the present invention by a multi-piece dome constructed from a plurality of rigid panels and configured to receive a hemispherical optical projection on an inner surface. The multi-piece dome is lightweight, portable, self-supporting, and easily assembled, disassembled and transported from one location to another.

The rigid panels of the multi-piece dome according to the present invention are provided as unitary structural elements with a rigid body portion having an inner view surface and exterior surface. At least one of the rigid panels of the multi-piece dome, and preferably a plurality of the rigid panels, has a rigid body portion having an arcuate inner view surface configured to define a spherical sector. The rigid body portion of the rigid panel is preferably formed of a material comprising a polymeric material and a opacifier. The material has a predetermined opacity, color and surface texture providing a rigid body portion with an arcuate inner view surface having a predetermined retroreflectivity suitable for receiving the projection of an image from an optical hemispherical projection system thereon.

The rigid panel also preferably has connecting means for detachably connecting the rigid body to the rigid body portion of at least one other rigid panel in forming the multi-piece dome. The connecting means are preferably attached to the exterior surface of the rigid body.

The multi-piece dome also preferably has rigid panels having a rigid body portion configured and formed of a material having a sufficient rigidity that the dome is self-supporting free of additional support members. Therefore, a lightweight rigid panel for use in constructing a lightweight, portable, rigid, self-supporting dome for use with a hemispherical optical projection system is provided. Also, a lightweight, portable, rigid, self-supporting dome structure with an inner view surface for use with optical projection systems, including hemispherical optical projection systems is provided.

The multi-piece dome described according to the present invention also, preferably, includes a rigid keystone. The rigid keystone includes the material and structural properties described above in relation to the rigid panel, except the rigid keystone has an axisymmetric rim portion instead of the edge portion described. The rim portion is configured so as to align with and mate with at least one rigid dome panel.

The multi-piece dome according to the present invention is preferably utilized in combination with a hemispherical optical projection system providing a focused image on the inner view surface projected from the center of said dome. The multi-piece dome is also preferably used in combination with tilting means for tilting the hemispherical optical projection system such that the hemispherical projecting system projects focused images onto a plurality of predetermined positions on the inner view surface. An improved projection structure for use with hemispherical optical projection systems is thereby provided. Further, a dome is provided having a viewing surface with versatility in receiving images from various hemispherical optical projection systems and at various angles of projection.

The multi-piece dome according to the present invention in one embodiment has an upper dome portion and a lower dome portion formed by a plurality of the rigid dome panels described herein. Preferably, all of the upper rigid panels and a plurality of the lower rigid panels have the arcuate inner view surface described above. The upper and lower rigid panels having the arcuate inner view surfaces are matably joined such that the inner view surfaces define a truncated spherical inner dome view surface of a predetermined size to receive focused images projected on the inner surface.

The multi-piece dome according to the present invention also is preferably utilized in combination with a structural system for erecting the dome. The structural system has a structural support adapted to detachably connect to at least one of the rigid dome panels to provide support to the dome panels during erection of said dome. The structural support system preferably includes an arcuate ladder and structural apparatus used in constructing the multi-piece dome according to the present invention.

A method of constructing the multi-piece dome according to the present invention is provided including the following steps. First, having provided the rigid panels as and structural system described, a rigid keystone panel, as described, is detachably connected at a first predetermined height to at least one structural support. Then, a plurality of rigid panels, as described above, are detachably connected to the keystone and to adjacent rigid panels to form an upper dome portion. Next, the upper dome portion is raised to a second predetermined height with at one structural support, and in another embodiment, a plurality of structural supports. Further, a plurality of rigid lower dome panels are detachably connected to form a lower portion of the dome. Next, the structural support system is released to provide a self-supporting dome structure formed from the lower portion and upper portion of the dome. Thus, a projection dome structure which can be easily assembled and disassembled in a variety of locations, including indoors and outdoors, and without heavy machinery for use with hemispherical optical projection systems is provided. Further, the dome can be used at a variety of locations including as a flight simulator or virtual reality projection dome at trade shows, on-site training, and other temporary projection locations.

Further, the components of the multi-piece dome, including the plurality of rigid panels, the hemispherical optical projection system and tilting means, and equipment such as climate control means, electronics equipment, both individually and as a group, are sized to form a kit which fits within standard shipping crates, preferably no more than two shipping crates and fit within a trailer of a tractor-trailer. Therefore, a projection dome structure which can be easily transported from one location to another is provided by the multi-piece dome according to the present invention.

BRIEF DESCRIPTION OF THE DRAWINGS

FIG. 14 is a perspective view of fully constructed multi-piece dome.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIGS. 1 to 4, a multi-piece dome 15 configured to receive an image projected on an inner surface from a hemispherical optical projection system according to the present invention is illustrated. The multi-piece dome 15 has a truncated spherical inner view surface 16 illustrated in FIGS. 2 and 4. The inner view surface 16 is of a predetermined size configured to receive focused images projected thereon.

Figure 2:
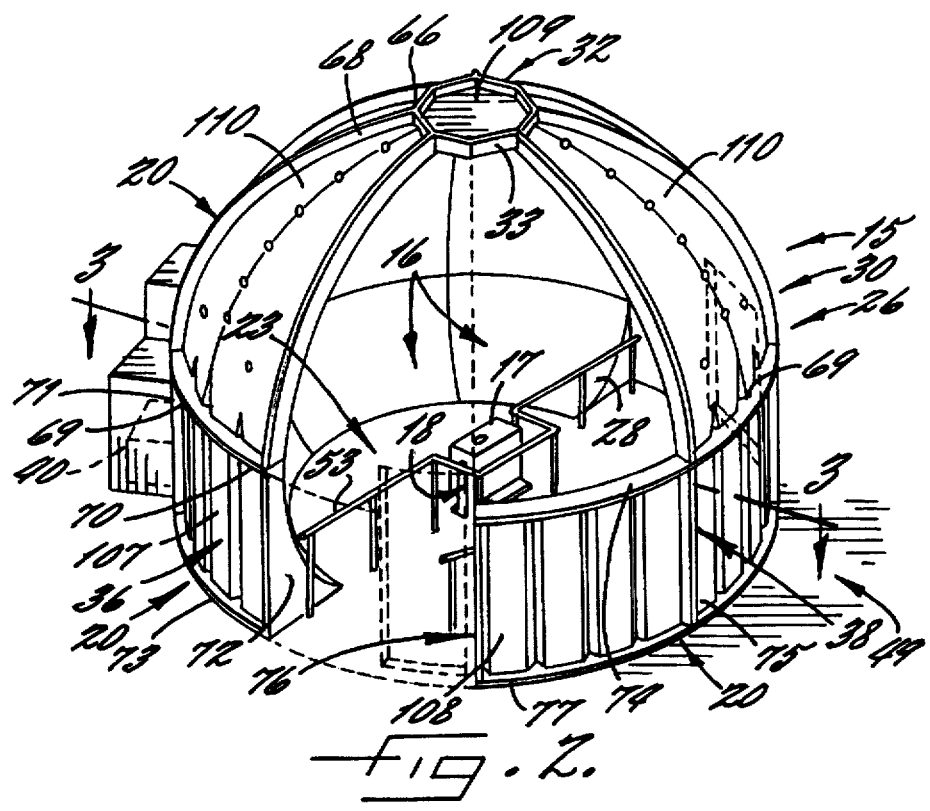
FIG. 2 is a cutaway perspective view of the multi-piece dome of FIG. 1 in combination with a center-mounted hemispherical optical projection system according to the present invention showing the truncated spherical inner view surface.
Figure 3:
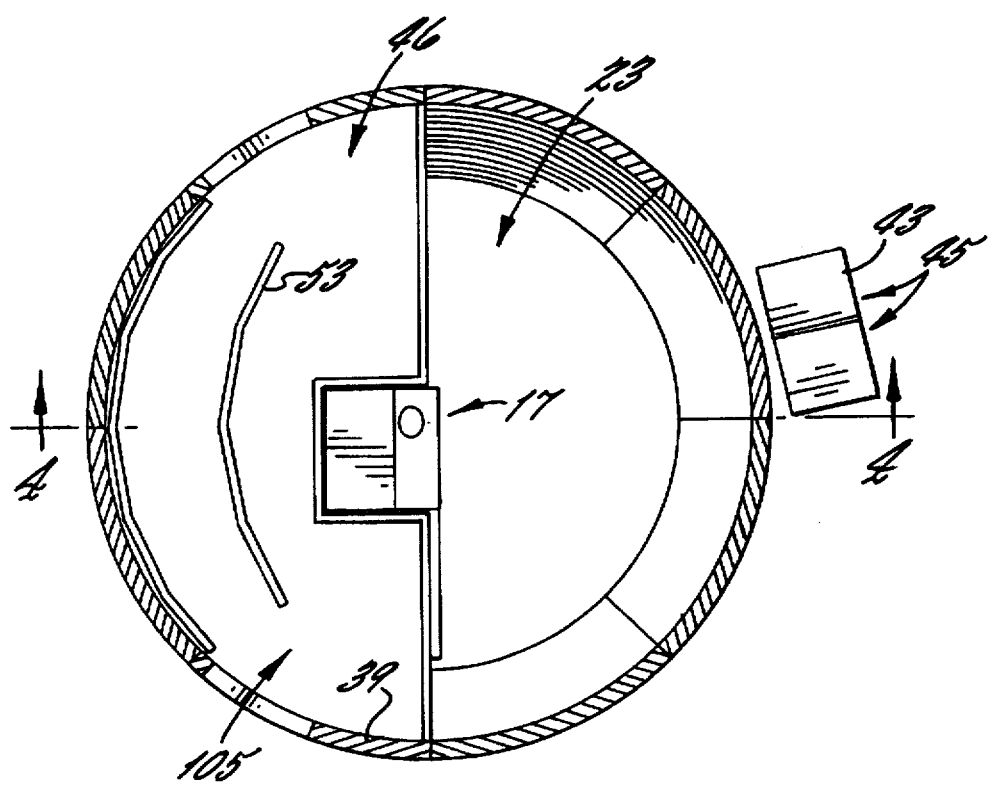
FIG. 3 is a top cross-section view taken along line 3—3 of FIG. 2 in combination with a center-mounted hemispherical optical projection system, climate control means, electronics equipment, a floor and viewer supports.
Figure 4:
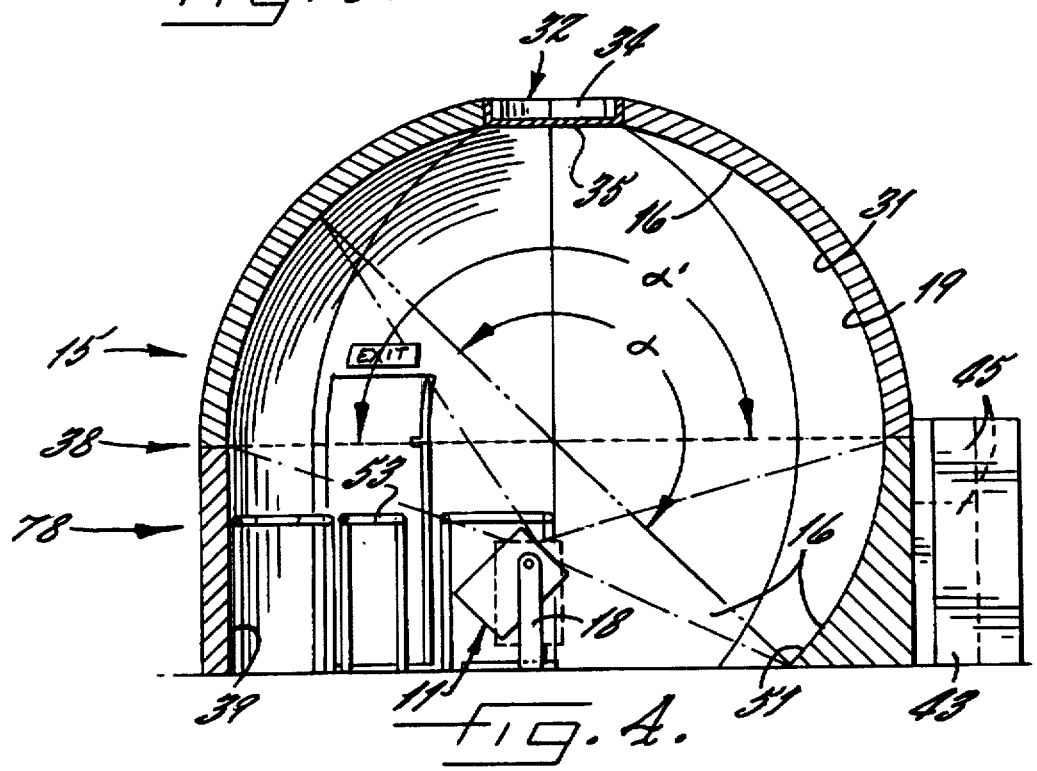
FIG. 4 is a cross sectional view taken along line 4—4 of FIG. 3 showing the projection of images from the hemispherical optical projection system at various angles onto the inner view surface.

The dome 15 is preferably utilized in combination with a hemispherical optical projection system 17 providing a focused image on the inner view surface 16 projected from a predetermined position within the dome 15 as illustrated in FIGS. 2 to 4. The dome 15 is also preferably utilized in combination with a tilting unit for tilting the hemispherical optical projection system 17 such that the hemispherical projecting system 17 projects focused images onto a plurality of predetermined positions on the inner view surface 16 as shown in FIG. 4. As also shown in FIG. 4, in one embodiment, this titling unit is a pivotal mounting apparatus 18 which provides the ability to tilt or position the hemispherical optical projection system 17 in a plurality of predetermined positions to project images at a plurality of angles of projection. Other alternative tilting means can also be utilized including manual and mechanized pivots, slides, or geared or other rotational mechanisms.

A hemispherical optical projection system 17 which projects the hemispherical projection having constant angular separation and tilting means are described in copending application Ser. No. 08/593,699 to Colucci et al., filed concurrently herewith, entitled "Tiltable Hemispherical Optical Projection Systems and Methods Having Constant Angular Separation of Projected Pixels" and assigned to the assignee of the present application (Attorney Docket 8390-4), the disclosure of which is hereby incorporated herein by reference in its entirety. The hemispherical optical projection system 17 is preferably located at the center of the dome 15 (i.e., beneath the apex of the top portion of the hemispherical inner view surface 16 which is utilized in vertical planetarium projection) to project a hemispherical image on the inner view surface 16 as shown in FIGS. 2 and 3. The inner view surface 16 is configured to receive projection of hemispherical images in planetarium projection depicted as angle α' in FIG. 4. When the image is projected onto the portion of the inner view surface 16 depicted by angle α', the lower circumferential edge of the image is substantially parallel with the underlying surface. Also, the dome 15 is configured to receive hemispherical projection images from a variety of orientations such as an angle α (also illustrated in FIG. 4). When the image is projected onto this portion of the inner view surface 16, the lower circumferential edge of the image forms an angle of approximately 45 degrees with the underlying surface.

The multi-piece dome 15 can also be provided with an inner view surface 16 of varying dimensions for use with various hemispherical optical projection systems. The preferred hemispherical optical projection system 17 can be utilized in domes having varying sizes of truncated spherical inner view surfaces of diameters. Preferably, the multi-piece dome 15 has an inner view surface 16 diameters of about 3 to 9 meters. More preferably, the multi-piece dome 15 has an inner view surface 16 with a diameter of about 5 to 7 meters.

Figure 1:
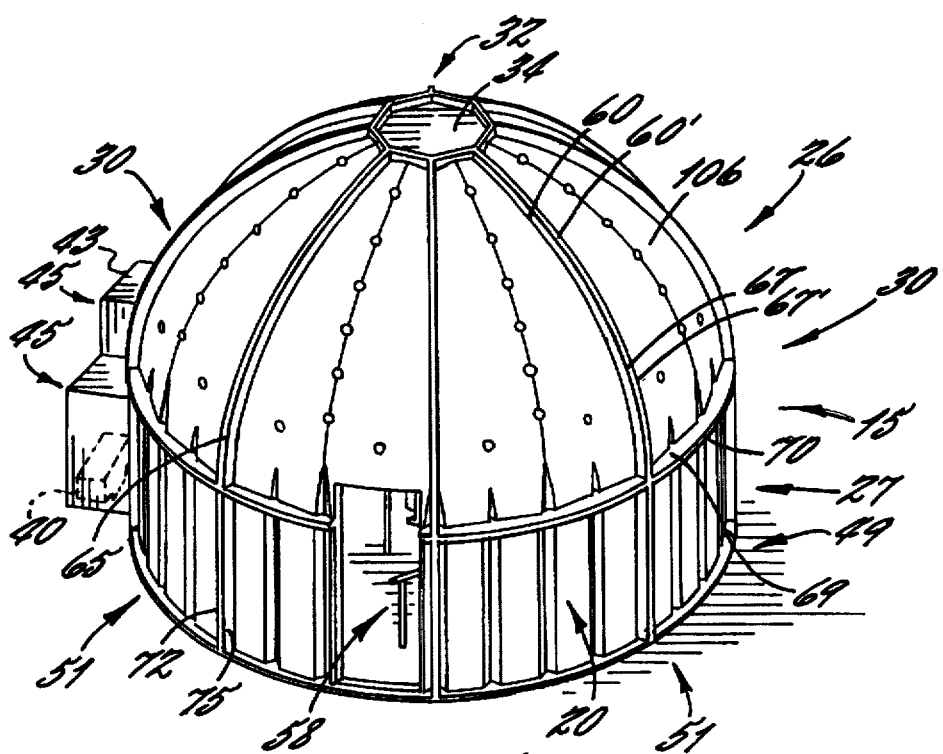
FIG. 1 shows a perspective view of a multi-piece, self-supporting dome for use with a hemispherical optical projection system according to the present invention.
Figure 9:
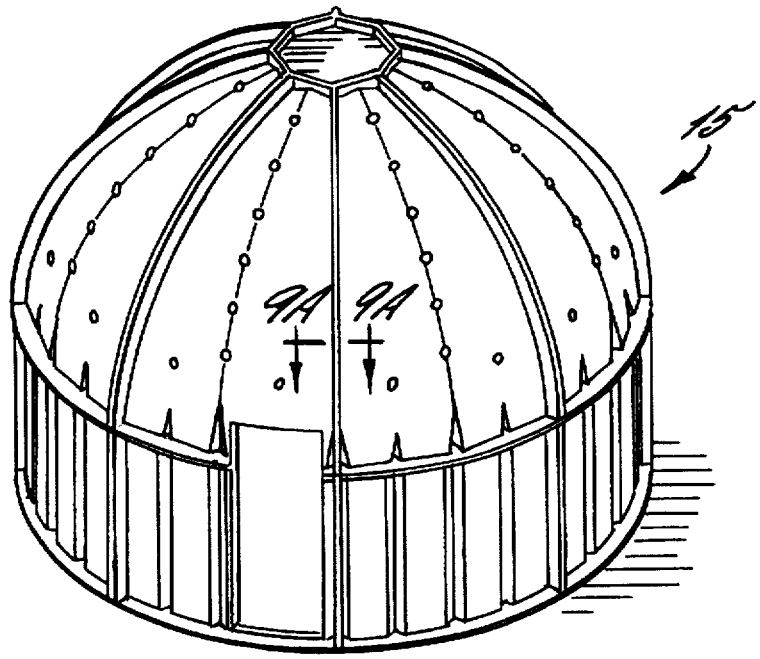
FIG. 9 is a perspective view of a completely constructed multi-piece dome for use with a hemispherical optical projection system.
Figure 9A:
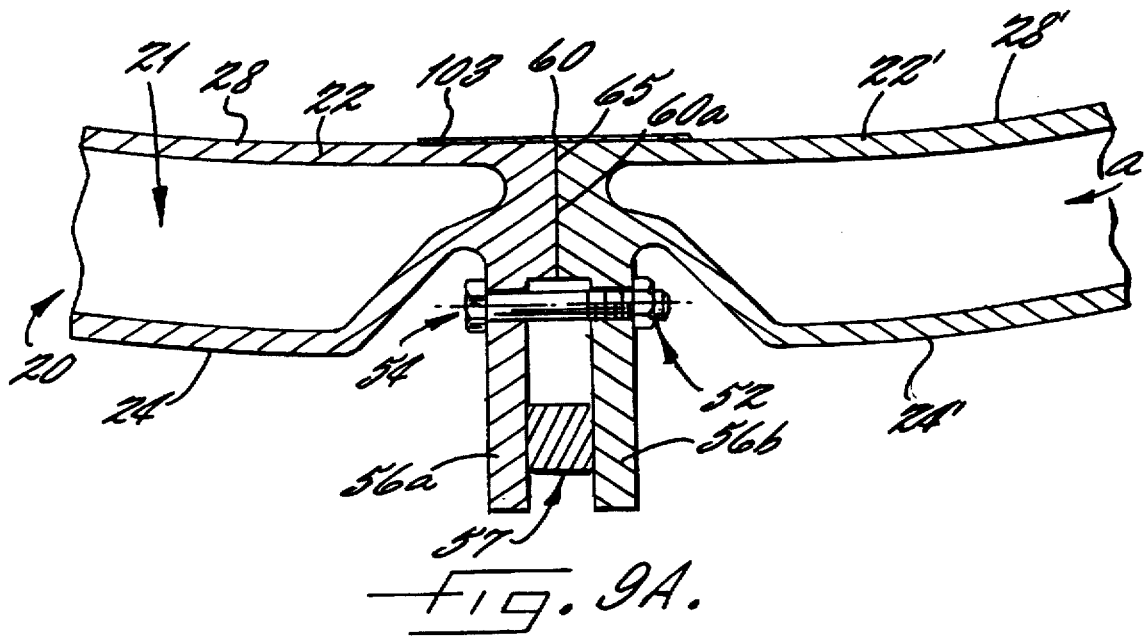
FIG. 9A is a cross-sectional view taken along line 9A—9A of FIG. 9 showing a joint of two rigid panels.

The multi-piece dome 15 is constructed from a plurality of rigid panels 20 shown in FIGS. 1 and 2. Each rigid panel 20 has a rigid body portion 22, an exterior surface 24 and connecting means for releasably connecting each of the rigid panels 20 to adjacent rigid panels 20' to form the multi-piece dome 15 as shown in FIGS. 2 and 9A. In various embodiments of the multi-piece dome 15, a plurality of these rigid panels 20 have an arcuate inner view surface 28 as depicted in FIGS. 2 and 4. FIG. 2 also shows the rigid panels 20 which are configured in different shapes to matably join and form different sections of the multi-piece dome 15.

In the embodiment of the multi-piece dome 15 shown in FIGS. 1 and 2, the multi-piece dome 15 includes rigid panels 20 including a plurality of upper rigid view panels 30 and a rigid keystone 32, which form an upper portion 26 of the dome 15. The dome 15, in FIGS. 1 and 2, also has a plurality of lower rigid view panels 36 and a plurality of lower rigid structural panels 38 which form a lower portion 27 of the dome 15.

The upper rigid view panels 30, lower rigid view panels 36 and rigid keystone 32 have, respectively, arcuate inner view surfaces 31, 37, 35. These inner view surfaces 31, 37, 35 are positioned in forming the multi-piece dome 15 such that they define the truncated spherical inner view surface 16 of a predetermined size to receive focused images projected on the inner view surface 16 shown in FIGS. 2 and 4. Each arcuate inner view surface 28, including 31, 37, 35, are configured to define a spherical sector. A spherical sector as defined herein constitutes a portion of a sphere. The spherical sectors of the arcuate inner view surfaces 28 including, for example, 31, 37, 35, when combined form the truncated spherical inner view surface 16 of the dome 15.

The rigid panels 20, preferably and illustratively, are constructed of identical materials. All of the rigid panels 20 have a rigid body portion 22 configured and formed of a material having sufficient rigidity that the dome 15 is self-supporting free of additional support members. Various configurations of rigid panels 20 and inner view surfaces 22 can be provided according to embodiments of the multi-piece dome according to the present invention.

Thus, the multi-piece dome 15 according to the present invention, as shown in the embodiment in FIGS. 1 to 4, is a lightweight, portable, self-supporting, rigid, and easily assembled structure with an inner view surface 16 having desired surface characteristics for use with projections from hemispherical optical projections systems 17 at various angles of projection. The multi-piece dome 15 is suitably utilized in a variety of environments and locations, including as a simulator at trade shows, outdoor exhibitions, sporting events, and military exercises, as a training device in indoor and outdoor locations, and even in a home theater or movie theater applications. As such, the particular aspects of the multi-piece dome 15 according to the present invention are described herein in more detail.

Further, the multi-piece dome 15 according to the present invention can preferably be provided with an electronic unit 40. The electronic unit 40 provides audio sounds and video images within the dome 15. In the embodiment of the multi-piece dome 15 shown in FIG. 1, the electronics unit 40 is rack-mounted and are stored in kiosks or towers 45 outside of the dome 15. The rack-mounted electronics are of the "plug and play" variety as commonly known to those of ordinary skill in the electronics art. Alternatively, the electronics unit 40 can be positioned in a cavity 21 formed in a rigid panel 20 as described herein. The details of the electronics equipment are well known to those skilled in the optical projection art and need not be described further herein.

The multi-piece dome 15 according to the present invention is also preferably provided with climate control systems, such as heating and air-conditioning units 43 illustrated in FIGS. 1 and 2. The climate control systems can also be stored in kiosks or towers 45 outside of the dome 15, as well as in the interior 23 of the dome 15 or in a cavity 21 of a rigid panel 20, for controlling the climate in the interior 23 of the dome 15. The details of climate control systems are well known to those skilled in the climate control art and need not be described further herein.

The multi-piece dome 15 according to the present dome also preferably has a floor 46 comprising floor sections 47 constructed in the interior 23 of the dome 15 as shown in FIG. 3. The floor 46 occupies a portion of the interior 23 of the dome 15. The floor 46 defines an interior viewing section 105 of the dome 15 where viewing audience members can be positioned to view images projected on the inner view surface 16 of the dome 15. This floor 46 comprises at least one flooring section 47 secured within the interior 23 of the dome 15 a predetermined height above the horizontal plane formed by the lower edges 50 of the lower rigid panels 51. This floor 46 is preferably weight bearing and self-supporting. The floor sections 47 are constructed on the supporting surface 49 shown as a building floor surface in FIG. 4. In the multi-piece dome 15, shown in FIG. 2, the floor 46 is not raised above the supporting surface 49. However, in another embodiment, the floor 46 is raised a predetermined height, such as a 8 inches, in a dome 15 having an inner view surface 16 with a diameter of 5 meters. Alternatively, various configurations and constructions of this floor 46 can be provided. One of the purposes of such a raised floor 46 is to provide a place to store and protect equipment for the hemispherical optical projection system 17, electronics units or equipment 40, electrical wiring and climate control means under the floor 46. This floor 46 provides the advantage of keeping the equipment secure and out of view from the audience viewers inside the interior 23 of the dome 15 as well as raising the viewers in a portion of the dome 15.

The multi-piece dome 15 also preferably and illustratively comprises viewer supports for supporting viewers in a stationary position while viewing images projected on the inner view surface 16 of the dome 15. As shown in FIGS. 2 and 3, these viewer supports include railings 53 for supporting viewers in a stationary standing or sitting position during viewing within the dome 15. Configurations of railings 53 are well known to those skilled in the art and need not be described further herein. Alternatively, the multi-piece dome 15 can include other viewer supports such as seating, straps, or other support apparatus such as airplane cockpits or car bodies for various applications such as simulation of flight or driving.

The multi-piece dome 15 can also be provided, in another embodiment, with devices such as keyboards, game devices, computer terminals, monitors, and other such means for audience interaction.

As stated, the multi-piece dome 15 is constructed from a plurality of rigid panels 20 which provide a light-weight, portable, self-supporting dome structure which can be easily assembled and disassembled. Various configurations of the rigid panels 20 can be used to construct the dome 15. Each of the various types of rigid panels 20 is preferably a unitary panel with a rigid body portion providing structural strength and rigidity. Also, each rigid panel 20 should have an exterior surface and a material composition selected to provide certain surface characteristics relating to color, surface texture and opacity that enables the inner surface of the rigid body portion to function as an arcuate inner view surface.

Specifically, a rigid panel 20 according to the present invention is made of a material having a predetermined opacity. The opacity is selected so that the rigid panel 20 provides a rigid body portion 22 having an arcuate inner view surface 28 suitable for receiving an image thereon and for providing a darkened interior 23 for the dome 15. The rigid panel 20 in the embodiment of FIGS. 2 and 9A is a hollow panel having a rigid body portion 22 having an exterior surface 24, an inner view surface 28 and connecting means for detachably connecting the rigid panel 20 to other adjacent rigid panels 20 in forming a multi-piece dome 15. Other configurations of the rigid panel 20, including solid panels, filled core panels, and layered panels can be used with the present invention.

The embodiment of the multi-piece dome 15 shown in FIGS. 1 and 2 comprises a rigid keystone 32, a plurality of upper rigid view panels 30 releasably connected to the rigid keystone 32, a plurality of lower rigid view panels 36, and a plurality of lower rigid structural panels 38. The plurality of lower rigid view panels 36 and lower rigid structural panels 38 are releasably connected to adjacent lower rigid panels view panels 36, lower rigid structural panels 38 and upper rigid view panels 30.

Each of the rigid panels 20 according to the present invention, including upper rigid view panels 30, lower rigid view panels 36 and keystone 32 provide a unitary element. These rigid panels 20 including 30, 36, 32 have respective rigid body portions 106, 107, 34 providing structural rigidity. The rigid body portion 22, including 106, 107, 34, also includes an arcuate inner view surface 28 including, respectively, 31, 37, 35, with particular surface characteristics and an exterior surface 24, respectively 110, 42, 109, for use with other rigid panels 20 in constructing a multi-piece dome 15. A multi-piece dome 15, alternatively, could be provided having other configurations of rigid panels 20 including less or more panels having an arcuate inner view surface 28.

The lower rigid structural panels 38, as shown in FIGS. 2 and 4, are rigid panels 20 without an exposed arcuate inner view surface. Instead, these lower rigid structural panels 38 preferably and illustratively have acoustical treatment material 102 on the inner surface 39. This acoustical treatment is shown as a foam layer applied on the inner surface 39 of the rigid body portion 44 of the lower rigid structural panels 38. Other acoustical treatment material, known to those of ordinary skill in the art of acoustics can be utilized to advantageously manipulate the acoustical environment within the multi-piece dome 15.

These lower rigid structural panels 38 are matingly joined to the upper rigid view panels 30 and lower rigid dome view panels 36 or other lower rigid structural panels 38 as shown in FIG. 2. The inner surfaces 39 of these lower rigid structural panels 38 are aligned with the inner surfaces 39 of adjacent lower rigid structural panels 38 forming an acoustically treated segment 48 of the inner surface 19 of the multi-piece dome 15 separate from the portion of the dome 15 having the truncated spherical inner view surface 16 as shown in FIGS. 2 to 4. In this embodiment of the dome 15, the acoustically treated segment 48 is defined by the inner surfaces 39 of the four adjacent lower rigid structural panels 38.

All of the rigid panels 20 according to the present invention have a rigid body portion 22, for example, 106, 107, 108, 34, which provides the structural form and component, along with rigid body portions 22 of other rigid panels 20, of the dome 15 as shown in FIGS. 2 and 9A. This rigid body portion 22 is constructed of a material having sufficient structural strength to support its weight and the weight and stresses subjected upon it by adjacent rigid panels 20. The hollow rigid panel 20 shown in FIG. 9A provides a strong, lightweight panel for use in constructing the multi-piece dome 15. Further, the material of the rigid body portion 22 is selected because it can be precisely fabricated and also can be used in conjunction with other like-formed rigid body portions 22 of rigid panels 20 to form the self-supporting, multi-piece dome 15. Further, the material for the rigid body portion 22 is selected to enable the rigid panel 20 to provide a dome 15 that can be used in indoor, outdoor, light and dark environments.

The rigid body portion 22 is also formed from a material which provides in certain rigid panels, for example, 30, 32, 36, an integrally formed arcuate inner view surface 28, respectively 31, 35, 37, having predetermined desired surface characteristics including opacity, color and surface texture. All of the rigid panels 20 illustrated have an opacity of between about 75 per cent and 100 per cent. Preferably, the rigid panel 20 has an opacity about 100 per cent. The opacity of the rigid panels 20 can be dependent on the thickness of the rigid body portion 22. For example, a rigid body portion 22 of at least ⅛ (one-eighth) inch thickness of polyethylene typically has a 100 per cent opacity. At least one of the predetermined color and surface texture of the arcuate inner view surface 28 of the rigid panel 20 is selected to provide a predetermined retroreflectivity in the inner view surface 28 which is suitable for projection of images on the inner view surface 16 of the dome 15. The rigid panel 20 provides a rigid body portion 22 having preferably a retroreflectivity of a gain of between about 0.5 and 2.0, and more preferably, a retroreflectivity of a gain of about 1. This retroreflectivity of the arcuate inner view surface 28 of the rigid body portion 22 helps provide the visual acuity and other optical properties needed for projection of the image on the arcuate inner view surfaces 28 of the rigid panels 20 which constitute the inner view surface 16 of the dome 15. The contrast of the interior 23 of the dome 15 is also increased by this material of the rigid panel 20.

The rigid panel 20 is also preferably provided with predetermined colors. These colors are preferably selected from the group of: 5 to 25% grey and more preferably dolphin grey as classified on the Pantone classification series as described in the Pantone Color Match Guide. A colorant such as O'Neil 26783 with 0.50% D.OG Cable Wire Carbon Black is added. Details of such colorants are well-known to one of ordinary skill in the art and are not discussed herein.

The surface texture of the arcuate inner view surface 28 of the rigid body portion 22 has a textured finish of between about SPI-D2 and SPI-D4, preferably SPI-D3 on the scale for mold finish propagated by the Society of Plastic Industries, Inc. The surface texture is preferably integrally formed with the rigid body portion 22 during fabrication of the rigid panel 20.

In providing a rigid panel 20 according to the present invention, a material having these characteristics is selected, preferably a polymeric material due to ease of fabrication, cost and performance features. This polymeric material can include thermoset and thermoplastic materials. Suitable polymeric materials include polyolefins, including polymers selected from the group consisting of: polyethylene; polypropylene; polybutenes; polyisoprenes and copolymers thereof. Further suitable materials include fluoropolymers such as Dupont Tefzel and copolymers thereof and foams. Still further materials include resins selected from the group consisting of: nylons, polycarbonates, polyesters, fluoropolymers, ABS, vinyls including polyvinyl chloride and polyvinyl acetate, and copolymers thereof. Copolymers refers to elastomers produced by the polymerization of two or more dissimilar monomers. Preferably the material is a polymeric material, more preferably a polyolefin. Still more preferably, the material is a polyolefin selected from the group consisting of: polyethylene; polypropylene; copolymers thereof, and most preferably, the material of the rigid panel 20 is a linear lower density polyethylene such as a product sold by Exxon Corporation as Exxon® LL-8361. The linear low density polyethylene material rigid panel 20 material has a density of between about 0.92 and 0.95 grams per cubic centimeter, and preferably, about 0.932 grams per cubic centimeter. Further, this material has a tensile strength of about 2300 psi and a flexural modulus of about 73,000 psi at 1% secant.

The opacifier added to the material of the rigid panel 20 is preferably a blue titanium dioxide opacifier such as a futile ultramarine blue white product.

Preferably, the rigid panel 20 according to the present invention has a rigid body portion 22, including an inner view surface 28, formed of a material comprising 97 parts linear low density polyethylene, and 3 parts opacifier and colorant.

An ultraviolet light inhibitor is also preferably added to the polymeric material to provide protection to the material of the rigid body portion 22 of the rigid panel 20, and especially the exterior surface 24, for uses of the multi-piece dome 15 outdoors when the exterior surface 24 of the dome 15 will be exposed to ultraviolet rays. The ultraviolet inhibitor added to the material of the rigid panel 20 can be known to one of ordinary skill of the art of polymer materials and need not be discussed in detail herein.

The rigid panel 20 is formed, for example, by a process of rotational molding which is known to one of ordinary skill in the art of large-part plastics manufacturing. Other suitable processes known to one of skill in the art for forming a rigid panel 20, such as blow-molding, bulk molding, slush molding, injection molding and the like, can be used depending on the size and configuration of the rigid panel.

As stated, the rotational molded rigid panels 20 are integrally formed in a unitary element. Prior the rotational molding process, the mold is sandblasted, preferably with 85 psi silica, to provide the textured inner view surface 28 with a preferred textured finish. While this method is preferred in providing a textured inner view surface 28 during fabrication of the rigid panel 20, other methods of providing the textured surface could be utilized including sandblasting the rigid panel after molding.

The rigid body portion 22 also preferably comprises an exterior surface 24 opposite the inner view surface 28 that includes affixing means for affixing visible indicia to the exterior surface 24. For instance, the rigid body portion 22 of the rigid panel 20 can be provided including affixing means such as clamps, hooks, latches, bolts, threaded insert molded into the rigid panels 20 either during of after molding, or other like means to releasably connect a flag, banner or other visible indicia on the exterior side 24 of the rigid panel 20 and adjacent rigid panels 20. Such visible indicia could provide, for example, advertising at a trade show.

The rigid panel 20 as shown in FIG. 9A can alternatively be formed with a rigid body portion 22 comprising an exterior surface 24 opposite the inner view surface 28 that includes visible indicia integrally formed with the exterior surface 24. Such integrally formed indicia can be provided by various methods known to those of ordinary skill in the art of plastic part fabrication. For example, during the rotational molding process, the mold can be sprayed with paint or other marking media which is integrally formed into the rigid body portion 22 during molding of the rigid panel 20 to provide visible indicia on the exterior surface 24 of the rigid panel 20.

The rigid panel 20 according to the present invention also further comprises at least one edge portion 60 adjacent the inner view surface 28. The edge portion 60 of the rigid panel 20 shown in FIGS. 2 and 9A extends along a portion of the periphery of the rigid body portion 22 and is configured to mate with an edge portion 60a of at least one additional rigid panel 20. The embodiment of the rigid panel 20 shown in FIGS. 1 to 4 and 9A has an edge portion 60 which is a generally flat, planar surface. The edge portion 60 in this embodiment preferably joins in a butt joint 65 between adjacent rigid panels 20 having a similar flat edge portion 60a.

Figure 7:
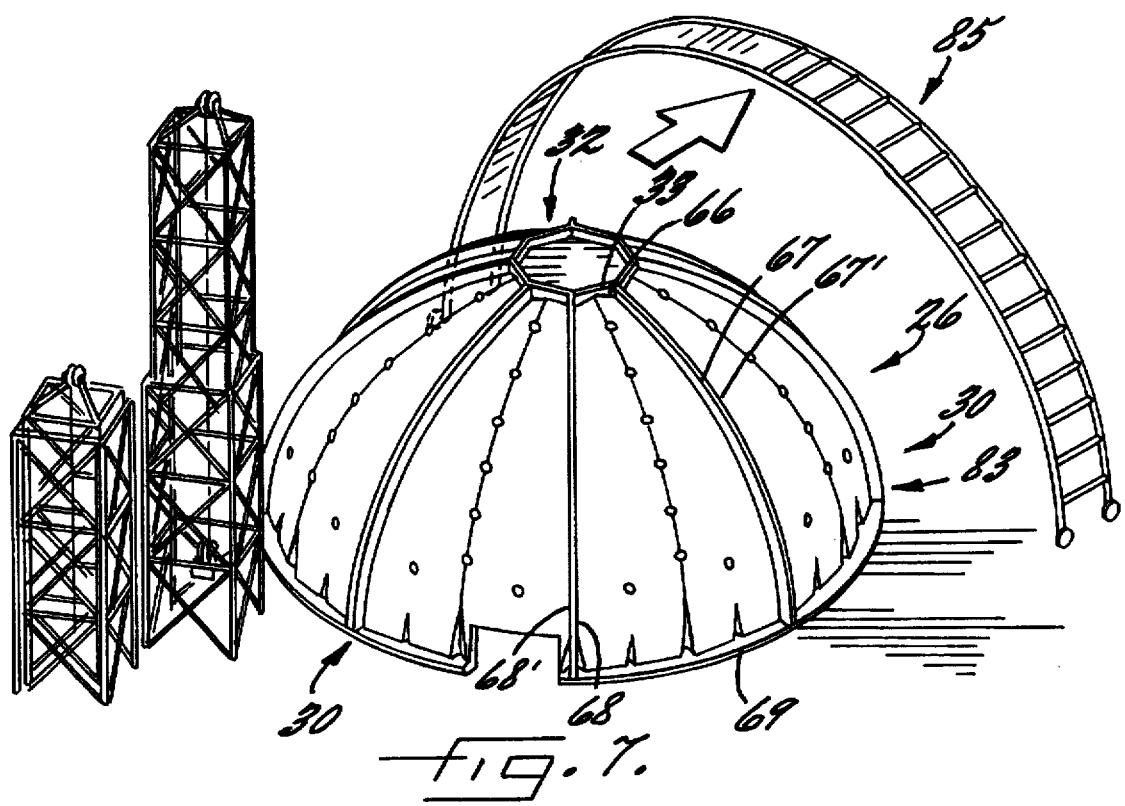
FIG. 7 is a perspective view of a partially constructed multi-piece dome having a plurality of upper rigid panels releasably connected to the keystone and to adjacent upper rigid panels forming an upper portion of the dome and further showing an arcuate hemispherical ladder moved away from the dome and a plurality of structural supports positioned next to the dome.

As shown in FIG. 7, each of the upper rigid view panels 30 has four edge portions: a top edge 66, two side edges 67 and 68 and a bottom edge 69, configured to matably join with edges portions of other rigid panels 20 forming the multi-piece dome 15 according to the present invention. In FIGS. 1, 2 and 7, the joining of the edge portions 66, 67, 68 and 69 of the upper rigid view panels 30 are shown. The top edge 66 of an upper rigid view panel 30 matably joins with the rim portion 33 of the rigid keystone 32. Two side edges 67 and 68 of the upper rigid panel 30 matably join with adjacent side edges 67' and 68' of other upper rigid view panels 30. The bottom edge 69 of the upper rigid view panel 30 matably joins with the top edge 70 of a lower rigid view panel 36 or the top edge 74 of a lower rigid structural panel.

The lower rigid view panels 36 have four edge portions 70, 71, 72 and 73 shown in FIG. 2. In addition to the top edge portion 79 which joins with the bottom edge portion 69 of the upper rigid view panel 30 as described herein, the lower rigid view panels 36 have two side edge portions 71 and 72 and which matably join with respective adjacent lower rigid view panels 36 and lower rigid structural panels 38 as shown in FIGS. 1 and 2. As depicted in FIG. 2, the bottom edge portion 73 is configured to mate with the supporting surface 49 in providing a portion of a base 78 to the multi-piece, self-supporting, rigid dome 15 according to the present invention.

The lower rigid structural panels 38 also have four edge portions including a top edge portion 74, two side edge portions 75 and 76, and a bottom edge portion 77. The top edge portion 74 joins with the bottom edge portion 69 of the upper rigid view panel 30 as described herein. The two side edge portions 75 and 76 of the lower rigid structural panels 38 matably join with respective edge portions of adjacent lower rigid view panels 36 and lower rigid structural panels 38 as shown in FIG. 2. As depicted in FIG. 2, the bottom edge portion 77 is configured to mate with the supporting surface 49 in providing a portion of the foundation of the multi-piece self-supporting dome 15 according to the present invention.

The rigid keystone 32, as described above, with an inner view surface 31, has a rigid body portion 34 formed of the same material and process as described in relation to the rigid panel 20 generally herein. Additionally, the rigid keystone 32 is configured having an axisymmetric rim portion 33 extending along a periphery of the rigid body portion 22 as shown in FIG. 2. "Axisymmetric" as used herein means a shape, that can be divided into two or more substantially identical sections, each of which has two sides extending diametrically from the geometric center of the rigid keystone 32. An "axisymmetric rim portion" as described herein includes rim portions which are generally circular, oval, regular polygonal, or polygonally shaped including squares, rectangles, triangles, hexagon, pentagons, octagons, dodecahedrons and other multi-sided shapes having a center portion.

The axisymmetric rim 33 is further configured so as to align with and mate with at least one rigid panel 20 or preferably one upper rigid view panel 30 as shown in FIG. 2. In the embodiment illustrated in FIG. 2, the rigid keystone 32 according to the present invention has a rim portion 33 which is octagonal and which aligns with and mates with the top edge portions 66 of the eight upper rigid view panels 30.

The rigid panels 20 according to the present invention, including the upper rigid view panels 30, the lower rigid view panels 36, the lower rigid structural panels 38 and the rigid keystone 32, preferably comprise connecting means for detachably connecting the rigid body portion 22, for example, 106, 107, 108, 34, of each rigid panel 20 to at least one other rigid panel 20 in forming the multi-piece dome 15. One embodiment of the connecting means is shown in FIG. 9A and described herein.

Each of the various configurations of rigid panels 20 including the upper rigid view panels 30, rigid keystone 32, lower rigid view panels 36 and lower rigid structural panels 38 can, and illustratively do, include the same connecting means. These connecting means are connected to the exterior surface 24 of the rigid body portion 22 of the rigid panels 20. These rigid panels 20 have a flange connected to the rigid body 22 configured to connect to flanges of other adjacent rigid panels 20 to connect the adjacent rigid panels in conjunction with fasteners such as a nut 52 and bolt 52 or other fastening means. Other connecting means such as include clamps, latches, bolts, ties or other fastening means to releasably connect adjacent rigid panels 20 can also be used in connection with the present invention. These connecting means connect the rigid body portions 22 of the rigid panels 20 such that the edge portions 60 and 60a align as shown in FIG. 9A. Preferably, the connecting means are provided permanently attached or integrally formed to each rigid panel 20 such that when adjacent rigid panels 20 are aligned, the respective connecting means on each rigid panel 20 align to mate such that respective rigid panels 20 can be releasably connected. In the embodiment of the multi-piece dome 15 according to the present invention of FIG. 9A, the connecting means comprise a bolt 54 and nut 52 inserted through adjacent flanges 56a and 56b to releasably connect adjacent rigid panels 20. A compressible spacer 57 is positioned between the adjacent flanges 56a and 56b to force the outside of the joint 27 apart and to force the inner seam between the rigid panels 20 and 20' together.

Preferably the connecting means are located on the exterior surface 24 of each rigid panel 20 spaced a predetermined distance apart. The connecting means are spaced apart approximately 12 inches on each connecting face of the rigid panels 20. These connecting means are spaced apart along the joints 65 formed between various adjacent rigid panels 20. Also, preferably, the connecting means are secured by hand without tools such as by fasteners, clamps and levers and other mechanisms of this type. These connecting means are also preferably accessible from the exterior surface 24 of the rigid panels 20.

The joints of the multi-piece dome in another embodiment include additional connecting means such as a T-shaped flange pressed into the joints between panels. This T-shaped flange would provide a contiguous inner surface.

The rigid panel 20 according to the present invention can also be provided with other edge portion and joint configurations. Corresponding edge portions of adjacent rigid panels can be provided in other embodiments with mating edges of other types such as beveled, toothed, tongue-and-grooved, lap jointed and like configurations which align rigid panels to provide a multi-piece, self-supporting dome having an inner view surface.

One other embodiment of the multi-piece dome, not illustrated herein, includes a plurality of rigid panels having grooved edge portions. The rigid body portion of each rigid panel has a groove extending along the length of the edge portions. The groove is designed to be used to align adjacent rigid panels. Each upper rigid view panel has a groove extending the length of the top edge portion, side edge portions and bottom edge portions. The rigid keystone has a groove extending the periphery of the axisymmetric rim portion. The lower rigid panels, including the lower rigid view panels and lower rigid structural panels have a groove at least in the top edge portion and side edge portion.

When the edge portions of the rigid panels in this embodiment are matably aligned in constructing the multi-piece dome, the grooves align to form an elongated cavity extending the length of each joint formed between adjacent edge portions. As adjacent rigid panels are matably aligned, an opening is left at the joints of the unmated edge portions for accessing the cavity.

A plurality of flexible elongated alignment members are provided configured to approximate the dimensions of the elongated cavity formed by matably aligning the edge portions of the rigid panels in the multi-piece dome according to the present invention. The flexible alignment members can be constructed of a variety of flexible members. Flexible materials such as a rubber or other flexible polymers are preferable.

A flexible alignment member is inserted in the opening of the cavity formed in each joint after matably aligning adjacent rigid panels. Each alignment member generally fills a cavity and contacts each rigid panel within the adjacent grooves. An alignment member is preferably inserted in each of a plurality of joint cavities, and more preferably, in every cavity of every joint between adjacent rigid panels. The alignment member serves to assist in stabilizing alignment of the rigid panels in constructing the multi-piece dome according to the present invention.

As stated, various configurations of rigid panels 20 including hollow, solid, core filled and honeycombed panels could be used in constructing the multi-piece dome 15. The rigid panel 20 further preferably has a rigid body portion 22 where the exterior surface 24 is spaced apart from the inner view surface 28 to form a cavity 21 therebetween as shown in FIGS. 2 and 9A. The hollow rigid panel 20 shown in FIG. 9A can have varying dimensions of thickness. The thickness of the rigid panel 20 will affect the volume and width of the cavity 21.

Preferably, in the rigid panel 20, the inner view surface 28 is spaced apart at least ¼ (one-quarter) inch from a portion of the exterior surface 24. Further, in the hollow rigid panel 20 shown in FIG. 9a, the exterior surface 24 is spaced apart from the inner surface 28 to provide at least a one inch cavity 21. In the lower rigid view panel 36 the arcuate inner view surface 37 extends in an inwardly-directed arc while the exterior surface 42 follows a generally vertical path, thus forming an increasingly wider cavity 21 at the bottom edge 73 of the lower rigid view panel 36.

In the dome 15 having an truncated spherical inner view surface 16 of about 5 meters shown in FIG. 1, the rigid panels 20 have, illustratively, the following dimensions. The upper rigid view panels 30 have a length measured as the distance on a generally straight line between the top edge portion 66 and the bottom edge portion 69 of about 3.12 meters and a width across the bottom portion from side edge 67 to side edge 68 of about 1.91 meters. The lower rigid view panels 36, of FIG. 1, have a length measured as the distance along the exterior surface 42 between the top edge portion 70 and the bottom edge portion 73 of about 1.76 meters and a width across the bottom portion of the rigid body portion 107 from side edge 71 to side edge 72 of about 1.91 meters. Further, the lower rigid view panels 36, of FIG. 1, have a width along the bottom edge 73 measured along a side edge 71, 72 between the interior surface 37 and exterior surface 42 of about 0.934 meters and a width along the bottom edge 73 measured in the middle of the rigid body portion 107 between the interior surface 37 and the exterior surface 42 of about 0.732 meters. The rigid keystone 32 of FIG. 1 has a diameter of about 1.0 meters and a width along the rim portion 33 of about 0.202 meters. The lower rigid structural panels 38, of FIG. 1, have a length measured as the distance along the exterior surface 111 between the top edge portion 74 and the bottom edge portion 77 of about 1.77 meters and a width across the bottom portion of the rigid body portion 108 from side edge 75 to side edge 76 of about 1.91 meters. The lower rigid structural panels also have a width of about 0.202 meters along the top edge portion 74 and bottom edge portion 77 between the exterior surface 111 and inner surface 39.

In the embodiment in FIG. 9A, tape 103 can be pressed over the seams of the joints 27 between rigid panels 20 and 20' to ensure a consistent inner viewing surface 16 of the dome 15. Various tapes 103 having a predetermined color and surface texture which can be matched to that of the rigid panel 20 are suitable. Suitable tapes include various cloth tapes, printed paper tapes, and polymer tapes. Preferably a tape such as a white vinyl coated cloth tape, P-665-2-WH, produced by the Independence Tape Co., Monroe, N.C. is utilized. Preferably, strips of about 2 inches in width are placed over the seams. The tape is coated with a latex paint to match the color and surface texture of the rigid panels 20 is. The tape 103 provides retroreflectivity and surface characteristics suitable for projection of images on the inner view surface 16 of the dome 15.

The cavity formed on the rigid panels can preferably, in another embodiment, be used for storage, with an access door provided on the inner view surface or exterior surface of the rigid panels. Further, this cavity, in another embodiment, can be utilized to house climate control and electronics equipment systems out of view.

The dome 15 includes at least one door opening, and preferably two or more doors 58 shown in FIG. 2. The door openings 58, shown in FIG. 2, is formed in a rigid panel 20. Each door opening 58 is of a predetermined size sufficient to allow viewers to enter and exit the interior 23 of the dome 15 through the door opening 58. The door openings 58 in FIG. 2 are adapted to receive a fabric drapery (not shown) or other door closure apparatus. The fabric drapery is hung within the door opening 58, and constructed of a material having an opacity and color suitable for providing a darkened interior 23 for the dome 15.

Alternatively, the door 58 could be provided with a solid panel closure. A rigid panel could be provided with a solid door portion mounted on hinges or other movable door fasteners. This door could be constructed of the material and by the process described with respect to the rigid panels 20 such that the door would have an arcuate inner view surface as described.

Further, the dome 15, preferably is provided with fire safety equipment such as exit signs, fire extinguisher and emergency lighting. As such, the dome can preferably be provided to meet standard building codes for trade shows and other public exhibition venues.

A method for constructing the multi-piece dome 15 configured to receive an image from a hemispherical optical projection system 17 according to the present is also provided. The method of constructing the multi-piece dome 15 utilizes the rigid panels 20 described above. One embodiment of the method of constructing the multi-piece dome 15 according to the present invention is shown the sequence of FIGS. 5 to 9. An alternative method of constructing the multi-piece dome 15 according to the present invention is shown in FIGS. 10 to 14. In both embodiments, the method of constructing a multi-piece dome 15 for use with a hemispherical optical projection system 17 in projecting a focused image on an inner view surface 16 of the dome 15 comprises the steps described hereinbelow:

Initially, a rigid keystone 32 is detachably connected at a first predetermined height to at least one structural support. The rigid keystone 32 is as described above.

A plurality of rigid panels 20 as described previously are then detachably connected to the rigid keystone 32 and to adjacent rigid panels 20 to form an upper portion 26. At least one of the rigid panels 20 has an arcuate inner view surface 28 which defines a spherical sector as described. Each of the rigid panels 20, including the rigid keystone 32, is formed of a material which provides the inner view surface 28 with a predetermined retroreflectivity when receiving an image thereon.

The upper portion 26 of the dome is then raised to a second predetermined height with at least one structural support 80.

Next, a plurality of lower rigid panels 82 are detachably connected to adjacent upper rigid panels 83 and to adjacent lower rigid panels 82 to form a lower portion 27 of the dome 15. The lower portion 27 forms, with the upper portion 26, a self-supporting dome structure 10. The plurality of lower rigid panels 82 includes at least one lower rigid panel 82 having an arcuate inner view surface 28. The lower rigid panels 82, the rigid keystone 32 and the upper rigid panels 83 are thereby detachably connected such that the inner view surfaces 28 and 31 align to define a truncated spherical inner dome surface 16 of a predetermined size to receive focused images projected on the inner surface 12. Next, the structural support is released from the dome 15 to provide a self-supporting dome structure 15.

As stated, one embodiment of this method is more fully described in FIGS. 5 to 9, while another embodiment is more fully described in FIGS. 10 to 14. In both embodiments of this method, having provided the rigid panels 20 described above, including a rigid keystone 32, upper rigid view panels 30, lower rigid view panels 36 and lower rigid structural panels 38, the method of constructing the multi-piece dome 15 for use with a hemispherical optical projection system 17 in projecting a focused image on an inner view surface 16 is preferably in detail as follows.

First, in both embodiments of the method according to the present invention, a rigid keystone panel 32, as described above, is detachably connected at a first predetermined height to a structural support 80. One advantage of the rigid keystone 32 as described is that it is lightweight, about 15 pounds in the embodiment shown in FIGS. 5 and 10. The rigid keystone 32 is set at a predetermined height corresponding to the height of the top edge 66 of an upper rigid view panel 30.

Figure 5:
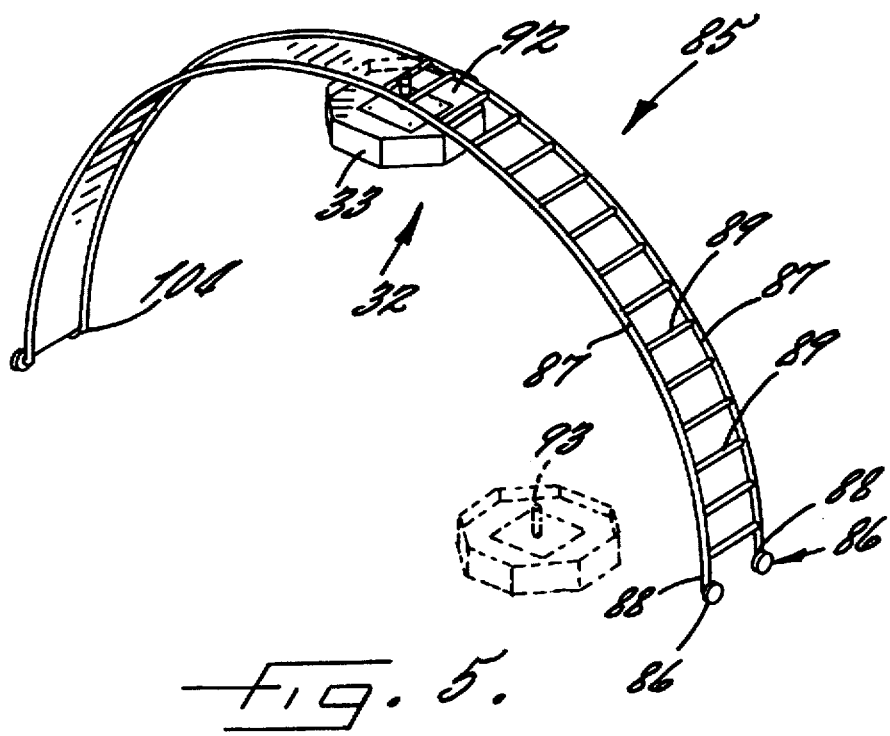
FIG. 5 is a perspective view of a rigid keystone in a second position detachably connected to a semicircular ladder at a predetermined height for constructing a multi-piece dome for use with a hemispherical optical projection system according to the present invention and in phantom view at a first position on a supporting surface.

Various structural supports could be provided to support a rigid keystone 32 at a predetermined height above a supporting surface 49 such as a floor, for example, a scaffolding. The embodiment in FIG. 5 shows a structural support 95 including preferably a semicircular arcuate ladder 85 on wheels 86. The semicircular arcuate ladder 85 for use in erecting a multi-piece dome 15 includes a pair of generally parallel arcuate elongated guide legs 87. Each of the guide legs 87 has at least one lower end 88. In this embodiment, each guide leg 87 of this semicircular arcuate ladder 85 also has a second lower end 104 shown in FIG. 5. The semicircular arcuate ladder 85 also has a plurality of spaced-apart rungs 89 connected generally normal to and between said guide legs 87.

The semicircular arcuate ladder 85 further has first means for moving the ladder 85 relative to an underlying support surface 49 shown in FIG. 5 as wheels 86. It is noted that other means of moving the ladder including wheels of various other configurations, curved saucer-like ends which would slide along a surface could also be used. These moving means or wheels 86 are connected to a lower end 88 of at least one of the elongated guide legs 87. In the embodiment shown in FIG. 5, the semicircular arcuate ladder 85 has wheels 86 connected to both lower ends 88 and 104.

This semicircular arcuate ladder 85 includes keystone connecting means for releasably connecting the rigid keystone 32 to the ladder 85 at approximately an apex 92 of the semicircular arcuate ladder 85. The keystone 32 is releasably connected to the ladder 85 fasteners such as a threaded rod connector on the keystone 32 which mates with a socket in the ladder 85 or other connecting means which releasably connect to a post member 93 which abuts vertically from the top surface 92 of the rigid keystone 32. The semicircular arcuate ladder 85 allows for construction of the upper portion 26 of the dome 15, under the semicircular arcuate ladder 85.

Figure 10:
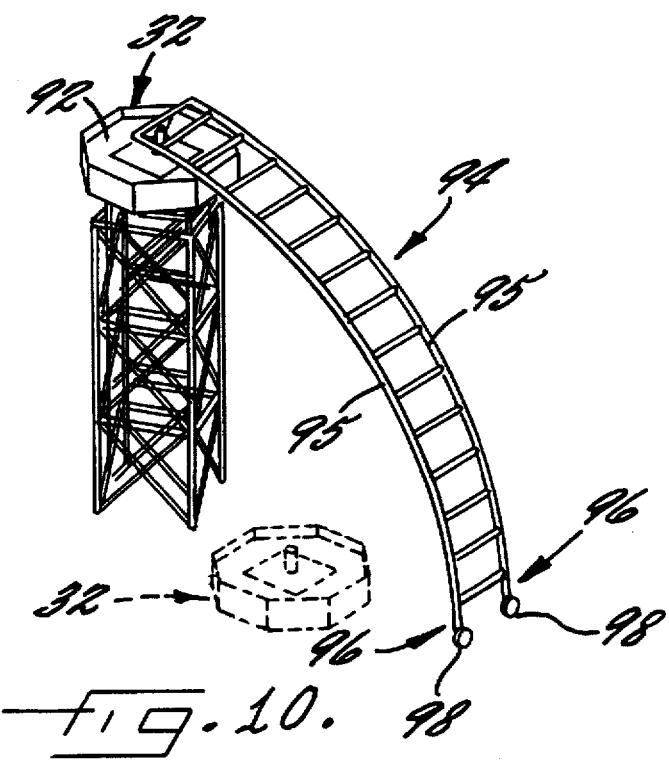
FIG. 10 is a perspective phantom view of a rigid keystone in a first position on a supporting surface and perspective view of a telescoping structural support detachably connected to the rigid keystone in a second position in constructing the multi-piece dome for use with a hemispherical optical projection system.

In the embodiment shown in FIGS. 10 to 14, the structural support to which the rigid keystone 32 is detachably connected at a predetermined height is a telescoping structural support 81 shown in FIG. 10. The telescoping structural support 81 has connection means for releasably connecting the rigid keystone 32 to the telescoping support 81. Preferably these keystone connecting means include a cylindrical male member 41 extending vertically from the top of the telescope structural support 81 which mates with a hollow cylindrical female post member 93 extending vertically from the top surface 92 of the rigid keystone 32. The rigid keystone 32 is secured in this hollow male member 41 in a male/female connection.

The telescoping structural support 81 has raising means including a winch for raising the structural support 81 to a predetermined height. Raising the telescope structural support 81 in turn raises the rigid keystone 32 to a corresponding predetermined height for constructing the multi-piece dome 15.

In the embodiment of FIG. 10, a hemi-semicircular arcuate ladder 94 is shown which detachably and rotatably connects by socket in the 94 and a mating threaded rod, previously described, on the female member 93 of the rigid keystone 32 for accessing the rigid keystone 32 and top edge portion 66 of the upper rigid view panel 30. This hemi-semicircular ladder 94 also has a pair of generally parallel arcuate elongated guide legs 95, each of the legs 95 having a lower end 96, and a plurality of spaced-apart rungs 97 connected generally normal to and between the guide legs 95.

Figure 11:
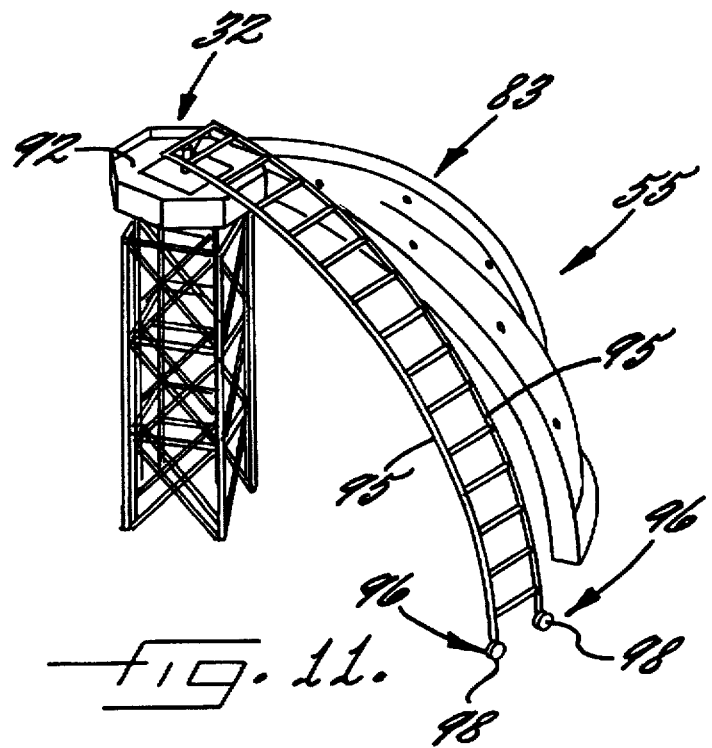
FIG. 11 is a perspective view of a rigid keystone releasably connected to a telescoping structural support and an arcuate ladder releasably connected to the keystone in constructing the multi-piece dome for use with a hemispherical optical projection system.

This hemi-semicircular ladder 94, also, like the semicircular ladder 85 shown in FIG. 5 has first means, preferably wheels 98, for moving the ladder 94 relative to an underlying support surface 49. The moving means or preferable wheels 98, are connected to a lower end 96 of the elongated guide legs 95. The ladder 94, in FIG. 10, has wheels 98 which allow the ladder 94 to be rotated relative to the dome 15. This ladder 94 in FIG. 10 rotates about a fixed point, the center of the rigid keystone 32. The arcuate ladder, 85 and 94, in the embodiments described according to the present invention also preferably have a predetermined arcuate curvature which correspond generally to the curvature of the rigid panels 20 of a multi-piece dome 15 having an exterior surface 55 with a predetermined arcuate shape as shown in FIGS. 7 and 11.

Having releasably connected the rigid keystone 32 to these support structures, respectively 85 and 81, the next step is to detachably connect a plurality of rigid panels 20 to the rigid keystone 32 and to adjacent rigid panels 20 to form an upper portion 26 of the dome 15. In the both embodiments of FIGS. 5 and 10, these upper rigid panels 83 comprise the upper rigid view panels 30 described above. As stated, at least one of the rigid panels 20 in the upper portion 26 has an arcuate inner view surface 28 which defines a spherical sector. Preferably, all of the rigid panels 20 in the upper portion 26 have this arcuate inner view surface 28. Also, each of the rigid panels 20 are formed of a material which provides the inner view surface 28 with a predetermined retroreflectivity when receiving an image thereon as described above. Also, these upper rigid dome view panels 28 are detachably connected such that the inner view surfaces 28 of the rigid panels 20 define a truncated spherical inner dome view surface 16 of a predetermined size to receive focused images projected on the inner surface 16. In the embodiments of FIGS. 5 and 10, the upper rigid panels 83 are eight of the upper rigid view panels 30 described herein.

The upper rigid dome view panels 28 are preferably detachably connected by connecting the connecting means located at the joints 65 of the adjacent rigid panels 20 as explained herein. The semicircular arcuate ladder 85 shown in FIG. 5 and the hemi-semicircular ladder 94 shown in FIG. 10 provide access to the connecting means at the joints 65 formed by the top edge 66 of the upper rigid view panels 30 and the rim portion 33 of the rigid keystone 32. Thus, in the embodiments of the method in FIGS. 5 to 10, this semicircular arcuate ladder 85 provides both structural stability and facilitate access to joints for assembling the dome 15. In the embodiment shown in FIGS. 10 to 14, the ladder 94 in combination with the telescoping structural support 81 provide the structural support to the rigid keystone 32 and access to the joints 65 between the rigid keystone 32 and the upper rigid view panels 28.

In both embodiments of this method, the upper rigid panels 83 are detachably connected to the rigid keystone 32 and to adjacent upper rigid panels 83 until an upper portion 26 of the dome 15 is formed. One advantage of the method according to the present invention is that none of the upper rigid dome view panels 30 have to be lifted off of the supporting surface 49 in constructing the dome. The rigid panels 20 can be slid into place as the rigid keystone 32 is set at the predetermined height which corresponds to the height of the top edge 66 of the upper rigid view panels 30. At this point a self-supporting upper dome portion 26 is completed with a truncated spherical inner view surface as shown in respective embodiments FIGS. 7 and 12.

Figure 12:
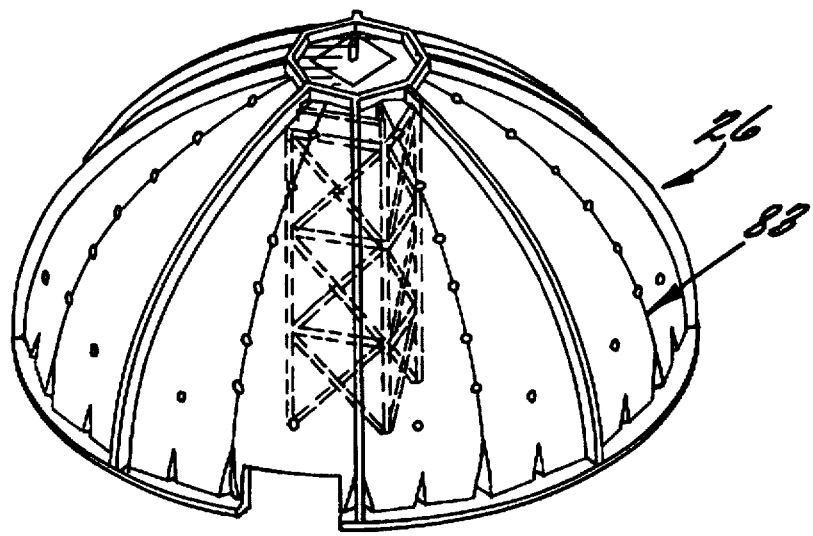
FIG. 12 is a perspective view of a plurality of upper rigid panels releasably connected to the keystone and to adjacent upper rigid panels forming an upper portion of the dome and supported by a telescoping structural support in constructing the multi-piece dome for use with a hemispherical optical projection system.

The hemispherical ladder 85 shown in FIG. 7 and the hemi-semicircular ladder 94 shown in FIGS. 11 and 12 are detached from the rigid keystone 32 and moved away from the dome 15. In the embodiment shown in FIG. 7, a plurality of support tower structures 101a, 101b, 101c and 101d, with accompanying winches which attach to hold edge portions 69 of the upper rigid view panel 30, are then provided. These support tower structures 101a, 101b, 101c and 101d are of sufficient height to raise the upper portion 26 to a second predetermined height above the supporting surface 49. In this embodiment, the structural supports are approximately 5 to 7 feet tall.

Figure 8:
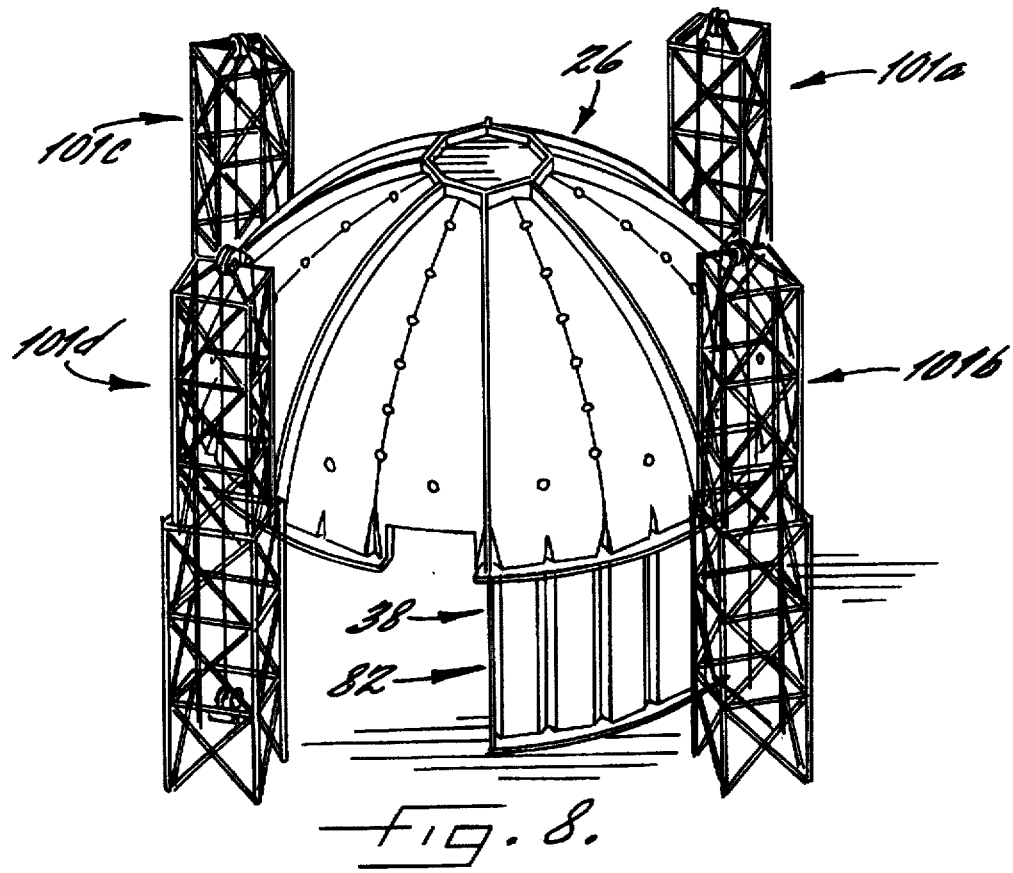
FIG. 8 is a perspective view of a plurality of structural supports supporting a partially constructed multi-piece dome.
Figure 13:
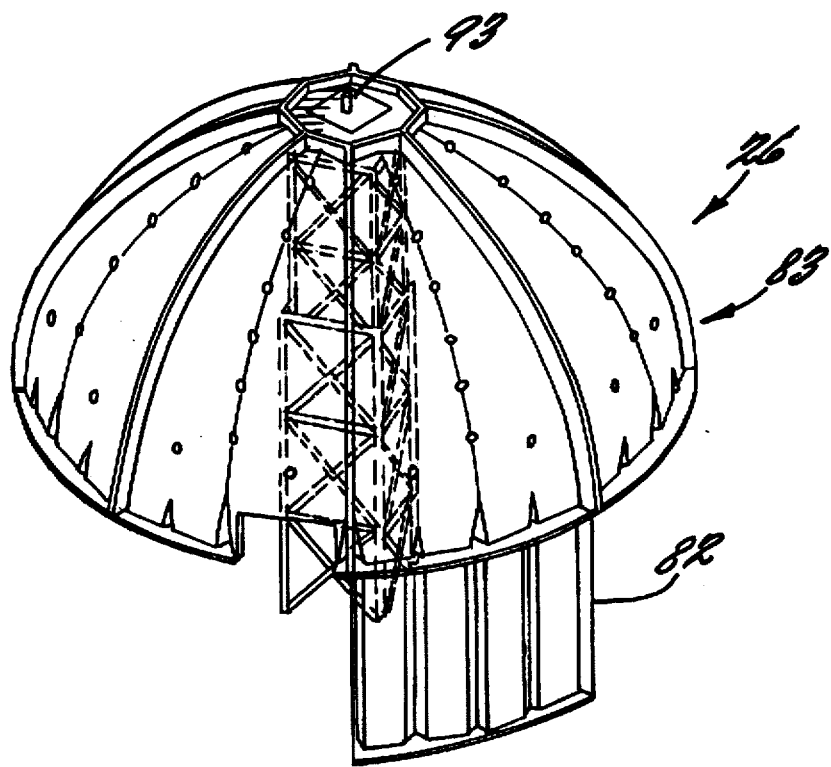
FIG. 13 is a perspective view of an upper dome portion with a lower rigid panel detachably connected and supported by the telescoping support in constructing a multi-piece dome.

As shown in FIG. 8, the four structural supports 101a, 101b, 101c and 101d with winches are used to raise the upper portion 26 to a second predetermined height. In the embodiment illustrated in FIG. 13, the telescoping structural 81 also has a wench which lifts the upper portion 26 by raising the actual structural support with the upper portion 26 of the dome 15 attached. These winches are known to one of ordinary skill in the structural art. In FIG. 13, the upper portion 26 of the dome 15 is shown at the predetermined second height. Other configurations of the support structures can be utilized to raise the upper portion 26 of the dome 15 to its predetermined height.

With the upper portion 26 of the dome 15 raised and supported by at least one structural support at its second predetermined height, the dome 15 is further constructed by detachably connecting a plurality of rigid lower panels 82 to adjacent upper rigid panels 83 and to adjacent lower rigid panels 82 to form a lower portion 27 of the dome 15 as shown in the respective embodiments of FIGS. 8 and 13. The lower dome portion 27 forms with said upper portion 26 a self-supporting dome 15 as shown in FIGS. 9 and 14.

In these two embodiments, the plurality of lower rigid panels 82 forming the lower portion 27 include a plurality of rigid lower dome panels 82 having an arcuate inner view surface 28. Various configurations of lower rigid view panels 82 can be used depending on the configuration of the desired inner view surface 16. In the embodiment shown in FIG. 9, four lower rigid view panels 36 are used along with four lower rigid structural panels 38 as described above. Thus the upper rigid view panels 30, the rigid keystone 32, and the lower dome view panels 36 are thereby detachably connected such that the inner view surfaces 28 align to define a truncated spherical inner view surface 16 of a predetermined size to receive focused images projected on the inner surface. In the embodiment in FIG. 9, the inner view surface 16 has a diameter of 5 meters.

The structural support or supports are then released from the rigid panels 20 to provide a self-supporting dome 15 comprised of the rigid panels 20 releasably connected in the upper portion 26 and lower portion 27 described herein. In the embodiment of FIGS. 8 and 9, the four structural supports 101a, 101b, 101c and 101d are released from the upper rigid panels 83 and moved away. In the embodiment shown in FIGS. 13 and 14, the telescoping structural 81 is released and lowered away from the inner surface 35 of the rigid keystone 32 and removed out the door opening 58.

The rigid keystone 32 is also alternatively configured to have a removable plug. The plug is removable to detachably connect the rigid keystone to the structural support. The plug can reinserted in the rigid keystone once the dome is completed to provide a contiguous inner view surface of the rigid keystone.

In FIGS. 5 to 9, and FIGS. 10 to 14 the method preferably comprises a step of placing a hemispherical optical projection system 17 within the interior 23 of the dome 15 at a predetermined location. Preferably, the hemispherical optical projection system 17 is placed at the center of the dome 15 as described.

In another embodiment of the method according to the present invention, the step of detachably connecting a plurality of rigid panels to the rigid keystone and to adjacent rigid panels to form an upper portion preferably includes detachably connecting a plurality of rigid panels to the rigid keystone and to adjacent rigid panels to form an upper portion by fastening connecting means by hand without tools. This is accomplished by providing connecting means in the rigid panels such as clamps which fasten by hand without tools.

Figure 6:
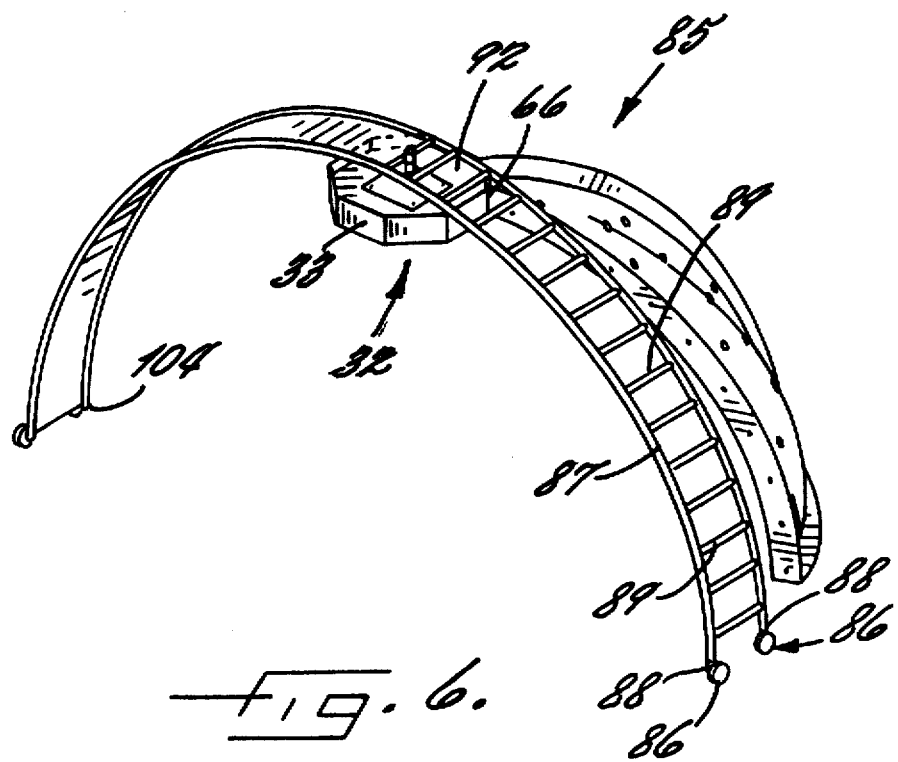
FIG. 6 is a perspective view of the rigid keystone of FIG. 5 detachably connected to a semicircular arcuate ladder.

The method of constructing a multi-piece dome 15 further preferably involves the step of disconnecting the rigid panels 20 from adjacent rigid panels 20 and the rigid keystone 32 to disassemble the dome 15. In the method shown in both of the embodiments of FIGS. 5 to 9, and FIGS. 10 to 14, a number of rigid panels 20 forming the lower portion 27 of the dome 15 can be disconnected from adjacent lower rigid dome panels 82 and from adjacent upper rigid panels 83. The structural supports, for example, 81, 101a, 101b, 101c, 101d, can be reconnected to the upper dome panels 83 after removing a number of the lower rigid panels 82 to support the upper portion 26 of the dome 15 as shown in FIGS. 8 and 13. When all of the lower rigid panels 82 have been removed, the upper portion 26 can be lowered to the support surface 49. The arcuate ladders 85 and 94 of both embodiments can then be repositioned as shown in FIGS. 6 and 11. The rigid keystone 32 can be again releasably connected to the structural support 81, 85 as described above in reference to FIGS. 11 and 6. The connecting means at the joints 65 between adjacent upper rigid panels 83 and the rigid keystone 32 can be then disconnected. When all of the upper rigid panels 83 have been disconnected, the rigid keystone 32 can be disconnected from the arcuate ladder 85 or telescoping structural support 81.

This method of assembling and disassembling a multi-piece dome according to the present invention allows for construction of self-supporting dome 15 with limited additional equipment and machinery required. The arcuate ladder in its various forms shown in FIGS. 5 and 10 solves the problem of accessing the connecting means at joints 65 between the rigid keystone 32 and the upper rigid panels 83. The arcuate ladder also provides the structural support for building the dome 15 by releasably connecting upper rigid panels 83 to the rigid keystone 32. The method of constructing the dome 15 also has the advantage of not requiring any piece other than the lightweight, rigid keystone 32 to be lifted off of the supporting surface 49. The other rigid panels including the upper rigid panels 83 and lower rigid panels 82 can be slid into place. The rigid panels 20 are lightweight, as described above, due to the construction and material, also facilitating the construction of the dome 15 in this method.

Among the significant advantages of the multi-piece dome 15 according to the present invention are the portability and ease of assembly and disassembly. As explained, these features are facilitated by the weight and configuration of the various dome components. Thus, the individual rigid panels 20 and components of the multi-piece dome 15 according to the present invention are sized for shipping and transportation by conventional methods such as by truck, sea or by air transport. A generally accepted shipping means is a standard shipping crate or container. These shipping crates are known to one of ordinary skill in the art and have the generally accepted dimensions of 8 feet by 8 feet by 20 feet. Further, shipping by tractor-trailer truck is another common means of transport. A standard trailer of a tractor-trailer truck has the dimensions of 8.5 feet by 8.5 feet by 40 feet.

Thus, each of rigid panels 29, including the upper rigid view panels 30, lower rigid view panels 36, rigid keystone 32, and lower rigid structural panels 38, are provided with a predetermined volume and dimensions less than the volume and dimensions of a standard shipping crate, as described herein above. Further, the plurality of rigid panels 20 which constitute the multi-piece dome 15 according to the present invention, illustrated in FIGS. 1, 9 and 14 have a predetermined volume less than the volume of two standard shipping crates and less than the volume of a standard trailer for a highway tractor-trailer truck. Thus, both the individual rigid panels 20 and the plurality of rigid panels 20 are sized to be arranged within the space of a single trailer of a tractor-trailer truck as well as within two standard shipping crates.

Thus, a kit for providing an optical projection display dome according to the present invention is supplied comprising a plurality of rigid panels 20 as described above. A kit is provided including the multi-piece dome 15 described in FIGS. 1, 9 and 14, which includes a plurality of rigid panels 20 which are sized to fit within two standard shipping crates as well as within a single trailer for a tractor-trailer truck. Further, a kit for providing an optical projection display multi-piece dome 15 preferably further includes a hemispherical optical projection system 16 as described. The hemispherical optical projection system 16 is of a predetermined volume and dimensions less than the volume and dimensions of two standard shipping crates and less than the volume and dimensions of a trailer for a tractor-trailer. The kit further preferably comprises a structural support as described herein. The structural support also has a predetermined volume and dimensions less than the volume and dimensions of two standard shipping crates and a predetermined volume and dimensions less than the volume and dimensions of a trailer of a tractor-trailer truck. The kit also preferably further includes climate control units as described previously. The climate control units also have a predetermined volume and dimensions less than the volume and dimensions of two standard shipping crates and less than the volume and dimensions of a trailer for a tractor-trailer truck. Additionally, the kit preferably comprises electronics units as described having a predetermined volume and dimensions less than the volume and dimensions of two standard shipping crates and less than the volume and dimensions of a trailer of a tractor-trailer truck. Thus, the kit provided according to the present invention can comprise various combinations of these elements, all sized to fit within individual shipping crates, and as a kit, to fit within two shipping crates and within the trailer of a tractor-trailer.

Preferably, the kit for providing an optical projection display dome 15 according to the present invention includes a plurality of rigid panels 20, hemispherical optical projection system 16, climate control units, a structural support system, and electronics units 40, all as described previously, wherein the kit is of a predetermined volume and dimensions less than the volume and dimensions of two standard shipping crates and less than the volume and dimensions of a trailer of a tractor-trailer truck.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A rigid panel for constructing a self-supporting, multi-piece dome, said dome being configured to receive a hemispherical optical projection on an inner surface, said panel comprising:

a rigid body portion having an arcuate inner view surface, said inner view surface configured to define a spherical sector, said body portion being formed of a material comprising a polymeric material and a opacifier, said material having a predetermined color and surface texture, at least one of said color or surface texture being selected so that said inner view surface is suitable for receiving an image thereon; and at least one edge portion adjacent said inner view surface, said at least one edge portion extending along a portion of the periphery of said body portion and configured to mate with an edge portion of at least one additional rigid dome panel.

2. A rigid panel defined by claim 1, wherein said view surface having said predetermined surface texture predetermined is integrally formed with said rigid body portion.

3. A rigid panel defined by claim 1, wherein said surface texture has a predetermined textured finish of between about SPI-D2 and SPI-D4.

4. A rigid panel defined by claim 1, wherein said body portion further comprises an exterior surface portion spaced apart from said inner view surface to form a cavity therebetween.

5. A rigid panel defined by claim 4, wherein said inner view surface is spaced apart at least one inch from said exterior surface portion.

6. A rigid panel defined by claim 1, wherein said body portion comprises an exterior surface opposite said inner view surface that includes means for affixing indicia to said exterior surface.

7. A rigid panel defined by claim 1, wherein said body portion comprises an exterior surface opposite said inner view surface that includes visible indicia integrally formed with said exterior surface.

8. A rigid panel defined by claim 1, wherein said edge portion is generally planar.

9. A rigid panel defined by claim 1, wherein said body portion further comprises an exterior surface and said rigid panel further comprising means for detachably connecting said body to at least one rigid panel in forming the multi-piece dome, said connecting means attached to said exterior surface of said body.

10. A rigid panel defined by claim 1, wherein said material provides said inner view surface with a retroreflectivity of a gain of about 1 when receiving an image thereon.

11. A rigid panel defined by claim 1, wherein said polymeric material is selected from the group consisting of: polyethylene; polypropylene; and copolymers thereof.

12. A rigid panel defined by claim 1, wherein said polymeric material is linear low density polyethylene.

13. A rigid panel defined by claim 1, wherein said polymeric material further comprises an ultraviolet light inhibitor.

14. A rigid panel defined by claim 1, where said body portion is integrally formed of a material having a density of between about 0.92 and 0.95 grams per cubic centimeter.

15. A rigid panel defined by claim 1, wherein said opacifier is a titanium containing compound providing a predetermined opacity.

16. A rigid panel defined by claim 1, where said material has a predetermined opacity, said opacity being selected so that said rigid panel provides a rigid panel suitable for receiving an image thereon and for providing a darkened interior for said dome.

17. A rigid keystone for a multi-piece dome for use with an hemispherical optical projection system comprising:

a rigid body portion having an arcuate inner view surface, said inner view surface configured to define a spherical sector, said body portion being formed of a material comprising a polymeric material and a opacifier, said material having a predetermined color and surface texture, at least one of said color or surface texture being selected so that said inner view surface is suitable for receiving an image thereon and an axisymmetric rim portion extending along a periphery of said body portion and configured so as to align with and mate with at least one rigid dome panel.

18. A rigid keystone defined by claim 17, wherein said rim portion is circular or polygonal.

19. A rigid keystone defined by claim 17, wherein said view surface having said predetermined surface texture is integrally formed with said rigid body portion.

20. A rigid keystone defined by claim 17, wherein said surface texture has a textured finish of between about SPI-D2 and SPI-D4.

21. A rigid keystone defined by claim 17, wherein said body portion further comprises an exterior surface portion spaced apart from said inner view surface to form a cavity therebetween.

22. A rigid keystone defined by claim 17, wherein said body portion comprises an exterior surface opposite said inner view surface that includes means for affixing indicia to said exterior surface.

23. A rigid keystone defined by claim 17, wherein said body portion comprises an exterior surface opposite said inner view surface that includes visible indicia integrally formed with said exterior surface.

24. A rigid keystone defined by claim 17, said polymeric material further comprises an ultraviolet light inhibitor.

25. A rigid keystone defined by claim 17, wherein said rim portion is generally planar.

26. A rigid keystone defined by claim 17, further comprising means for detachably connecting said body portion to at least one rigid panel in forming the multi-piece dome, said connecting means connected to said exterior surface of said body.

27. A rigid keystone defined by claim 17, wherein said material provides said view surface with a predetermined retroreflectivity of a gain of about 1 when receiving an image thereon.

28. A rigid keystone defined by claim 17, wherein said polymeric material is selected from the group consisting of: polyethylene; polypropylene; and copolymers thereof.

29. A rigid keystone defined by claim 17, wherein said polymeric material is linear low density polyethylene.

30. A rigid keystone defined by claim 17, wherein said body portion is integrally formed of a material having a density of about 0.92 and 0.95 grams per cubic centimeter.

31. A rigid keystone defined according to claim 17, further comprising connection means for releasably connecting said keystone to a structural support during construction of a multi-piece dome.

32. A rigid keystone defined by claim 17, wherein said material has a predetermined opacity of between about 75 per cent and 100 per cent.

33. A rigid keystone defined by claim 17 wherein said opacifier is titanium containing compound providing a predetermined opacity.

34. A multi-piece dome configured to receive a hemispherical optical projection comprising:
a plurality of rigid panels, each of said rigid panels having a rigid body portion having an arcuate inner view surface, and an exterior surface and means for releasably connecting each of said rigid panels to at least one other of said rigid panels, said rigid panels being positioned such that said inner view surfaces define a truncated spherical inner dome view surface of a predetermined size to receive focused images projected on said truncated spherical inner view surface, said rigid panels having a rigid body portion configured and formed of a material having sufficient rigidity that said dome is self-supporting free of additional support members.

35. A multi-piece dome defined by claim 34, in combination with a hemispherical optical projection system providing a focused image on said truncated spherical inner dome view surface projected from the center of said dome.

36. A multi-piece dome defined by claim 35, further comprising tilting means for tilting said hemispherical optical projection system such that said hemispherical projecting system projects focused images onto a plurality of predetermined positions on said truncated spherical inner dome view surface.

37. A multi-piece dome defined by claim 34, wherein at least one of said rigid panels being formed of a material having a predetermined retroreflectivity.

38. A multi-piece dome configured to receive an hemispherical optical projection on an inner surface comprising:
a plurality of rigid panels, at least one of said rigid dome panels having a rigid body portion having an arcuate inner view surface, said arcuate inner view surface configured to define a spherical sector, said body section being formed of a material comprising a polymeric material and a opacifier, said material having a predetermined color and surface texture, at least one of said color or surface texture being selected so that said inner view surface is suitable for receiving an image thereon said rigid panels matingly joined such that said inner view surfaces align to define a truncated spherical inner dome view surface of a predetermined size to receive focused images projected on said inner surface.

39. A multi-piece dome defined by claim 38, wherein said rigid panels having a rigid body portion configured and formed of a material having a sufficient rigidity that said dome is self-supporting free of additional support members.

40. A multi-piece dome defined by claim 38, wherein at least one of said rigid body portions has an exterior surface portion spaced apart from said arcuate inner view surface to form a cavity therebetween.

41. A multi-piece dome defined by claim 40, further comprising electronics means and climate control means positioned within said cavity.

42. A multi-piece dome defined by claim 40, wherein at least of one of said rigid panels has said body portion further comprising access means for accessing said cavity from at least one of said exterior surface and inner view surface.

43. A multi-piece dome defined by claim 38, wherein said rigid panels further comprise an exterior surface and wherein at least one of said rigid panels has said rigid body portion including means for affixing indicia to said exterior surface.

44. A multi-piece dome defined by claim 38, wherein said rigid panels further comprise an exterior surface and wherein at least one of said rigid panels has said rigid body portion including visible indicia integrally formed with said exterior surface.

45. A multi-piece dome defined by claim 38, wherein said predetermined textured surface is integrally formed with said rigid body portion.

46. A multi-piece dome defined by claim 38, wherein said surface texture has a predetermined textured finish of between about SPI-D2 and SPI-D4.

47. A multi-piece dome defined by claim 38, wherein said rigid panels have said rigid body portions further comprising at least one edge portion adjacent said inner view surface, said at least one edge portion extending along a portion of the periphery of said body portion and configured to mate with an edge portion of at least one additional rigid panel.

48. A multi-piece dome defined by claim 47, wherein said edge portion is generally planar.

49. A multi-piece dome defined by claim 43, wherein each of said rigid panels further comprise a rigid body portion having an exterior surface opposite said inner view surface and means for detachably connecting said body portion to at least one rigid panel in forming the multi-piece dome, said connecting means connected to said exterior surface of said body portion.

50. A multi-piece dome defined by claim 38, wherein at least one of said rigid panels having said material which provides said inner view surface with a predetermined retroreflectivity of a gain of about 1 when receiving an image thereon.

51. A multi-piece dome defined by claim 38, wherein at least one of said plurality of said rigid panels having said polymeric material which is selected from the group consisting of: polyethylene; polypropylene; and copolymers thereof.

52. A multi-piece dome defined by claim 38, wherein said polymeric material is a linear low density polyethylene.

53. A multi-piece dome defined by claim 38, wherein said polymeric material further comprises an ultraviolet light inhibitor in the exterior surface.

54. A multi-piece dome defined by claim 38, wherein said rigid panels have said rigid body portions integrally formed of a material having a density of about 0.932 grams per cubic centimeter.

55. A multi-piece dome defined by claim 38, wherein said rigid panels form a dome having said inner dome view surface having a diameter of between about 3 meters and 9 meters.

56. A multi-piece dome defined by claim 38, wherein one of said rigid panels comprises a rigid keystone further comprising an axisymmetric rim portion extending along a periphery of said body portion and configured so as to align with and mate with at least one rigid panel.

57. A multi-piece dome defined by claim 56, wherein said rim portion is generally circular or polygonal.

58. A multi-piece dome defined by claim 56, wherein said rigid keystone further comprises connection means for releasably connecting said rigid keystone to a structural support during construction of said multi-piece dome.

59. A multi-piece dome defined by claim 38, further comprising a floor comprising at least one flooring section secured within said dome a predetermined height above the horizontal plane formed by the lower edges of said rigid panels.

60. A multi-piece dome defined by claim 38, wherein said flooring section is weight-bearing and self-supporting.

61. A multi-piece dome defined by claim 38, further comprising viewer supports for supporting viewers in a stationary position while viewing images projected on said inner dome view surface of said dome.

62. A multi-piece dome defined by claim 38, further comprising climate control means for controlling the climate within the interior of said dome.

63. A multi-piece dome defined by claim 38, in combination with a hemispherical optical projection system providing a focused imaged on said inner dome view surface projected from the center of said dome.

64. A multi-piece dome defined by claim 63, further comprising means for tilting said hemispherical optical projection system such that said hemispherical projecting system projects focused images onto a plurality of predetermined positions on said inner dome view surface.

65. A multi-piece dome defined by claim 38, further comprising:
at least one structural panel having an inner surface including an acoustical treatment material, said at least one rigid structural panel being matingly joined to said rigid panels or other rigid structural panels, and said inner surface of said at least one rigid structural panel aligned with said inner surface of adjacent rigid structural panels forming an acoustically treated segment of said inner surface of said dome separate from said portion of said dome having said inner dome view surface.

66. A multi-piece dome defined by claim 38, wherein said plurality of said rigid panels further comprise:
a plurality of upper rigid panels, said upper rigid panels matably joined to adjacent upper rigid panels;
said upper rigid panels being positioned such that said inner view surfaces define a truncated spherical inner dome view surface of a predetermined size to receive focused images projected on said inner surface; and
a plurality of lower rigid panels having a rigid body portion, at least one of said lower rigid dome panels having a rigid body portion having an arcuate inner view surface, said view surface configured to define a spherical sector, said body portion being formed of a material suitable for receiving an image thereon,
said lower rigid panels matably joined such that said inner view surfaces define a truncated spherical inner dome view surface of a predetermined size to receive focused images projected on said inner surface; said at least one lower rigid panel having an inner view surface further matably joined to adjacent said upper rigid panels such that said inner view surfaces define a truncated spherical inner dome view surface.
said rigid panels having a rigid body portion configured and formed of a material having sufficient rigidity that said dome is self-supporting free of additional support members.

67. A multi-piece dome defined by claim 66, wherein said lower rigid dome panels form a lower circular dome portion of said dome.

68. A multi-piece dome defined by claim 38, in combination with a structural system for erecting said dome comprising:
a structural support adapted to detachably connect to at least one of said rigid panels to provide support to said rigid panels during erection of said dome.

69. A multi-piece dome, in combination with a structural system for erecting said dome defined by claim 68, said structural system further comprising:
an arcuate ladder configured to detachably and rotatably connect to one of said rigid panels on the exterior of said rigid panel, said ladder having rotation means connected to allow said ladder to be rotated relative to said dome panel during the erecting of said dome.

70. A multi-piece dome in combination with a structural system for erecting said dome as defined by claim 68, said structural system further comprising:
an arcuate ladder configured to approximate on arcuate exterior surface of said dome, said ladder releasably connected to a rigid panel, said ladder having rotation means connected to allow said ladder to be rotated relative to said dome during erecting of said dome.

71. A multi-piece dome in combination with a structural system defined by claim 68 wherein said structural support is telescoping between a plurality of predetermined heights such that said telescoping structural support supports said rigid panel at a predetermined height during erection of said dome.

72. A multi-piece dome in combination with a structural system defined by claim 68 further comprising a plurality of structural supports at least one of said structural supports adapted to detachably connect to at least one of said rigid panels to support said rigid panels at least one predetermined height during erection of the dome.

73. A multi-piece dome in combination with a structural system defined by claim 69, where said arcuate ladder is generally semicircular.

74. A kit for providing an optical projection display dome system comprising:

a plurality of rigid panels, at least one of said rigid panels having a rigid body portion having an arcuate inner view surface, said view surface configured to define a spherical sector, said body portions being formed of a polymeric material and opacifier having a predetermined color and surface texture, at least one of said color or surface texture being selected so that said inner view surface is suitable for receiving an image thereon;

said rigid panels matingly join such that adjacent said inner view surfaces define a truncated spherical inner dome view surface of a predetermined size to receive focused images projected on said inner surface; and means for detachably connecting said rigid panels to form a multi-piece dome for use with a hemispherical optical projection system.

75. A kit defined by claim 74, wherein one of said rigid panels has a predetermined volume and dimensions less than the volume and dimensions of a standard shipping crate.

76. A kit defined by claim 74, wherein said plurality of rigid panels have a predetermined volume and dimensions less than the volume and dimensions of two standard shipping crates and less than the volume and dimensions of a standard trailer for a tractor-trailer truck.

77. A kit defined by claim 74, further comprising:

hemispherical optical projection means for projecting images on said inner dome view surface, said hemispherical optical projection means adapted to be positioned within an interior space of said dome in a predetermined position for projection images on said truncated spherical inner dome view surface, said optical projection means of a predetermined volume and dimensions less than the volume and dimensions of two standard shipping crates.

78. A kit defined by claim 74, further comprising a structural support system for erecting said dome, said structural support system having a predetermined volume and dimensions less than the volume and dimensions of two standard shipping crates.

79. A kit defined by claim 74, further comprising climate control means for controlling the climate in said multi-piece dome, said climate control means having a predetermined volume and dimensions less than the volume and dimensions of two standard shipping crates.

80. A kit defined by claim 74, further comprising electronics equipment, said electronics means having a predetermined volume and dimensions less than the volume and dimensions of two standard shipping crates.

81. A kit defined by claim 74, further comprising hemispherical optical projection means for projecting images on said inner dome view surface, climate control means for controlling the climate within said dome, a structural support system, and electronics equipment, wherein said kit is of a predetermined volume and dimensions less than the volume and dimensions of two standard shipping crates and less than the volume and dimensions of a tractor-trailer truck trailer.

* * * * *